US012499902B2

(12) United States Patent
Srivastava et al.

(10) Patent No.: US 12,499,902 B2
(45) Date of Patent: Dec. 16, 2025

(54) INTELLIGENT AUDIO PROCESSING

(71) Applicant: SONY GROUP CORPORATION, Tokyo (JP)

(72) Inventors: Anubhav Srivastava, Bangalore (IN); Gopinath Ramananda, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 873 days.

(21) Appl. No.: 17/673,169

(22) Filed: Feb. 16, 2022

(65) Prior Publication Data

US 2023/0260531 A1 Aug. 17, 2023

(51) Int. Cl.
*G10L 21/02* (2013.01)
*G06N 20/00* (2019.01)
*G10L 19/022* (2013.01)
*G10L 21/028* (2013.01)

(52) U.S. Cl.
CPC ............ *G10L 21/028* (2013.01); *G06N 20/00* (2019.01); *G10L 19/022* (2013.01)

(58) Field of Classification Search
CPC ..... G10L 21/028; G10L 19/022; G10L 15/26; G10L 17/00; G10L 21/0272; G10L 25/63; G10L 21/00; G06N 20/00; G06N 3/0464; G06N 3/045; G06N 3/08; G10H 2210/036; G10H 2240/085; G10H 1/366; G10H 2210/056; G10H 2240/131; G10H 2250/311
See application file for complete search history.

(56) References Cited

U.S. PATENT DOCUMENTS

| | | | |
|---|---|---|---|
| 8,471,135 B2 | 6/2013 | Taub et al. | |
| 10,014,002 B2 | 7/2018 | Koretzky et al. | |
| 11,514,948 B1* | 11/2022 | Nair | G06F 16/2365 |
| 11,848,655 B1* | 12/2023 | Khalilia | G06F 3/165 |
| 2016/0071526 A1 | 3/2016 | Wingate et al. | |

(Continued)

OTHER PUBLICATIONS

Grais, et al., "Single Channel Audio Source Separation using Convolutional Denoising Autoencoders", Global Conference on Signal and Information Processing (GlobalSIP), Nov. 14-16, 2017, 05 pages.

(Continued)

*Primary Examiner* — Mark Villena
(74) *Attorney, Agent, or Firm* — CHIP LAW GROUP

(57) ABSTRACT

An electronic device and method for intelligent audio processing is provided. The electronic device receives a first user input for selection of a source audio signal. The electronic device receives a second user input for selection of a first operation to be performed on the source audio signal. The electronic device receives a third user input for selection of at least a first audio signal. The electronic device applies a first machine learning (ML) model on the source audio signal. The electronic device further extracts at least the first audio signal from the source audio signal based on the application of the first ML model on the source audio signal. The electronic device further applies a second ML model on the extracted at least first audio signal from the plurality of audio signals based on the first operation. The electronic device further generates output information as per the first operation.

19 Claims, 8 Drawing Sheets

(56) References Cited

U.S. PATENT DOCUMENTS

| | | | |
|---|---|---|---|
| 2016/0078879 A1* | 3/2016 | Lu | G10L 21/02 |
| | | | 381/56 |
| 2017/0236531 A1* | 8/2017 | Koretzky | G06F 3/04847 |
| | | | 381/17 |
| 2019/0082276 A1* | 3/2019 | Crow | H04R 25/505 |
| 2019/0215540 A1* | 7/2019 | Nicol | G06V 10/25 |
| 2019/0392802 A1* | 12/2019 | Higurashi | G06N 20/00 |
| 2020/0388284 A1* | 12/2020 | Candelore | H04N 21/440236 |
| 2021/0055796 A1* | 2/2021 | Mansbridge | G06F 3/167 |
| 2021/0321212 A1* | 10/2021 | Li | H04S 7/303 |
| 2021/0326102 A1* | 10/2021 | Morsy | G10L 21/043 |
| 2022/0044674 A1* | 2/2022 | Chen | G10L 15/183 |
| 2022/0139388 A1* | 5/2022 | Sharifi | G10L 15/02 |
| | | | 704/231 |
| 2022/0189461 A1* | 6/2022 | Zhao | G10L 15/19 |
| 2022/0246160 A1* | 8/2022 | Munoz | G10L 21/0208 |
| 2022/0270629 A1* | 8/2022 | Avendano | G10L 21/0232 |
| 2022/0310113 A1* | 9/2022 | Tzinis | G06V 10/82 |

OTHER PUBLICATIONS

Sharma, et al., "On the Importance of Audio-source Separation for Singer Identification in Polyphonic Music", Proceedings of Interspeech, Sep. 15-19, 2019, Graz, Austria, pp. 2020-2024.

\* cited by examiner

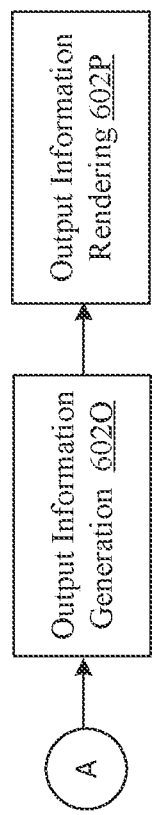

INTELLIGENT AUDIO PROCESSING

CROSS-REFERENCE TO RELATED APPLICATIONS/INCORPORATION BY REFERENCE

None.

FIELD

Various embodiments of the disclosure relate to audio processing. More specifically, various embodiments of the disclosure relate to an electronic device and a method for intelligent audio processing.

BACKGROUND

With a continuous increase in consumption of media content items, new media content items (such as audio and video) are being composed continuously. An audio portion of such media content items plays a crucial role in enhancing a user experience of a user consuming such media content. The audio portion of the media content engages audience, deliver information, evokes emotional responses, emphasizes what's on the screen (in case of video) and can be used to indicate an emotional state of an actor/signer. However, the audio portion usually requires some processing to be done so that the audio portion can provide at least one of the above-mentioned benefits. Traditional tools and methods for audio processing may require intervention of specialized personnel's (such as audio engineers), to process the audio portion of the media content items as per user's needs. Moreover, such traditional tools and methods for audio processing have a large set of hardware requirements and may incur a high licensing cost for people to fulfil their audio processing requirements.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for intelligent audio processing is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 6A and 6B are diagrams that collectively illustrate exemplary operations for intelligent audio processing, in accordance with an embodiment of the disclosure.

DETAILED DESCRIPTION

Figure 1:
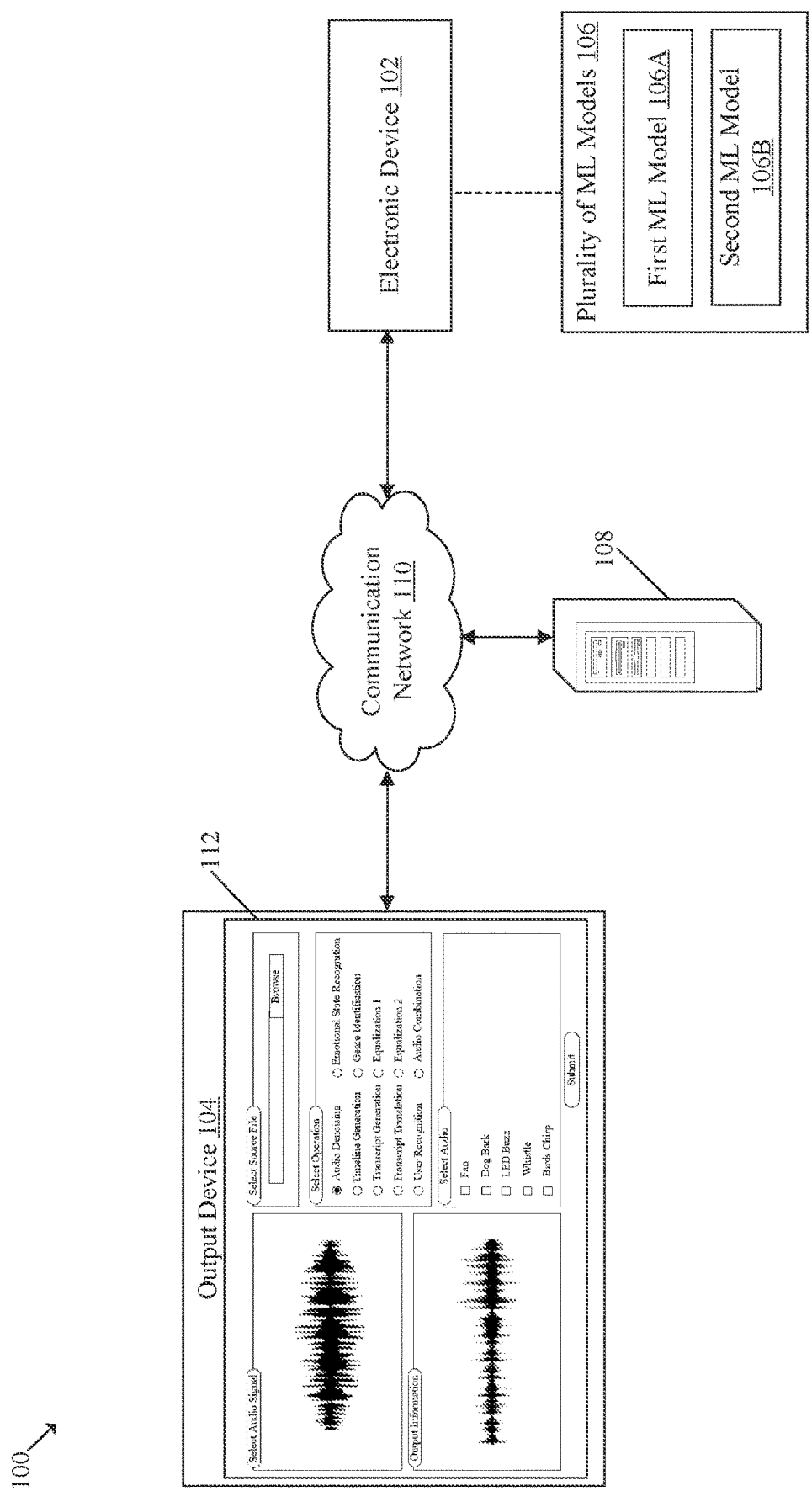
FIG. 1 is a block diagram that illustrates an exemplary network environment for intelligent audio processing, in accordance with an embodiment of the disclosure.

The following described implementations may be found in the disclosed electronic system and method for intelligent audio processing. Such method, when executed on the electronic device may automatically perform a plurality of operations related to audio processing. The electronic device may receive a set of user inputs via a user interface. The set of user inputs may include, but are not limited to, a first user input, a second user input, and a third user input. The first user input may be for a selection of a source audio signal, which may be a composite audio signal that may include a plurality of audio signals. The second user input may be for a selection of an operation (i.e. referred as a first operation) of the plurality of operations to be performed on the source audio signal. The third user input may be for a selection of at least a first audio signal from the plurality of audio signals. The electronic device may further apply a first machine learning (ML) model on the source audio signal based on the reception of the first user input (i.e. indicating the source audio signal) and the third user input (i.e. indicating the first audio signal in the source audio signal). The electronic device may further extract the first audio signal from the plurality of audio signals in the source audio signal based on the application of the first ML model on the source audio signal. The electronic device may further apply a second ML model (i.e. different from the first ML model) on the extracted first audio signal based on the first operation, which may be selected based on the second user input. The electronic device may further generate output information (i.e. that may be related to the selected first operation) based on the application of the second ML model on the extracted first audio signal. The electronic device may further control an output device (such as a television or a speaker) to render the generated output information.

Traditional tools for audio processing may require significant intervention of specialized personnel (such as audio engineers) to process the audio signal. Therefore, a human (who is not a specialized audio engineer) may not be able to effectively work on such traditional tools to fulfil their audio processing requirements. Also, user interfaces of such traditional tools are quite complex for an unspecialized human to understand and perform required audio processing task accurately. Further, such unspecialized human may need to spend an excessive cost to perform the required audio processing task with the help of specialized audio personnel or using traditional licensed tools available online. In contrast, the disclosed electronic device may possess the capability to perform several operations related to audio processing with minimal intervention from the human (i.e. who may not be a specialized audio personnel). The disclosed electronic device may utilize trained machine learning models to automatically perform various operations related to audio processing. Also, the disclosed electronic device may train the machine learning models according to specific audio processing requirements and operations (for example, removal of a specific type of audio signal from a composite audio signal, genre identification of the composite audio signal, transcription generation/translation from the audio signal, singer identification, audio equalization, sound re-mastering/mixing, and the like). Further, the user interfaces associated with the disclosed electronic device may be relatively easy for the unspecialized humans to perform different audio processing operations, as compared to the complex user interfaces of the traditional tools.

The disclosed electronic device may be further configured to separate specific vocal signals and audio signals from the composite audio signal based on the application of the ML models. Also, the disclosed electronic device may possess the capability to generate subtitles/transcripts associated with the composite audio signals. The disclosed electronic device may be further capable to identify singer, genre of music, remix music, karaoke etc. The disclosed electronic device may also be used for automatic volume gain control, which requires a normalization of a gain, while leaving out some exceptional sounds (like gunshots, explosion, etc.) included in the composite audio signal. The disclosed electronic device may be further able to identify customers of an organization and can be implemented in customer call centers associated with the organization.

Moreover, the disclosed electronic device and/or the method may be considered as an intelligent audio processing system/application that can be implemented as a web-plugin in multiple web-browsers. Therefore, the disclosed method may be executed in a variety of systems without any special (hardware or software) requirement. Also, with a functionality to be implemented as the web-plugin, the disclosed method may be performed on any underlying platform (e.g. operating system). Further, the disclosed electronic device and the method (i.e. capable to automatically perform variety of audio processing operations) may be easier for users to operate, as compared to the traditional tools that may require intervention from specialized audio engineers. Hence, the disclosed electronic device and the method may be inexpensive compared to the traditional tools that are known in the art for audio processing.

FIG. 1 is a block diagram that illustrates an exemplary network environment for intelligent audio processing, in accordance with an embodiment of the disclosure. With reference to FIG. 1, there is shown a network environment 100. The network environment 100 may include an electronic device 102, an output device 104, a plurality of machine learning (ML) models 106, a server 108, and a communication network 110. With reference to FIG. 1, there is further shown a user interface 112 that may be displayed on the output device 104.

The electronic device 102 may include suitable logic, circuitry, interfaces, and or code that may be configured to receive a set of user inputs and automatically perform each of a plurality of operations for audio processing based on the received set of user inputs. The electronic device 102 may generate output information based on the selected operation, and output the generated output information on the output device 104. Examples of the electronic device 102 may include, but are not limited to, an audio processing engine, a computer workstation, a mainframe machine, a server, a smartphone, a cellular phone, a mobile phone, a computing device such as a personal computer with or without a Graphics Processing Unit (GPU), and/or a consumer electronic (CE) device. In an embodiment, functionalities of the electronic device 102 may be implemented as a web application that may be accessible via a uniform resource locator (URL) and a web-browsing software installed on a different machine.

The output device 104 may include suitable logic, circuitry, and interfaces that may be configured to display the user interface 112. The output device 104 may be further configured to output the generated output information. The output device 104 may be a touch screen which may enable a user to provide a user-input via the output device 104. The touch screen may be at least one of a resistive touch screen, a capacitive touch screen, or a thermal touch screen. The output device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the output device 104 may refer to a display screen of a head mounted device (HMD), a smart-glass device, a see-through display, a projection-based display, an electro-chromic display, or a transparent display. In some embodiments, the output device 104 may be integrated with the electronic device 102 and may be an internal component of the electronic device 102.

In an embodiment, the output device 104 may also include a speaker. The speaker may include suitable logic, circuitry, and interfaces that may be configured to playback a processed audio signal that may be indicated by the generated output information. The speaker may be configured to receive electrical audio signals from circuitry (shown in FIG. 2) and convert the received electrical audio signals into the audio/sound output. In some embodiments, the speaker may be integrated with the electronic device 102 and may be an internal component of the electronic device 102. Examples of the speakers may include, but are not limited to, a loudspeaker, a woofer, a sub-woofer, a tweeter, a wireless speaker, a monitor speaker, or other speakers or sound output device.

Each of the plurality of machine learning (ML) models 106 may be a classifier/regression/clustering model which may need to be trained to identify a relationship between inputs, such as features in a training dataset. Each of the plurality of ML models 106 may be defined by its hyper-parameters, for example, number of weights, cost function, input size, number of layers, and the like. The parameters of each of the plurality of ML models 106 may be tuned and weights may be updated so as to move towards a global minima of a cost function for the corresponding ML model. After several epochs of the training on the feature information in the training dataset, each of the plurality of ML models 106 may be trained to output a prediction result for a set of inputs. The prediction result may be indicative of a class label for each input of the set of inputs.

Each of the plurality of ML models 106 may include electronic data, which may be implemented as, for example, a software component of an application executable on the electronic device 102. Each of the plurality of ML models 106 may rely on libraries, external scripts, or other logic/instructions for execution by a processing device, such as circuitry. Each of the plurality of ML models 106 may include code and routines configured to enable a computing device, such as the circuitry to perform one or more operations to output the set of recommendations. Additionally, or alternatively, each of the plurality of ML models 106 may be implemented using hardware including a processor, a microprocessor (e.g., to perform or control performance of one or more operations), a field-programmable gate array (FPGA), or an application-specific integrated circuit (ASIC). Alternatively, in some embodiments, each of the plurality of ML models 106 may be implemented using a combination of hardware and software. It may be noted that a number of ML models (i.e. the first ML model 106A and the second ML model 106A) of the plurality of ML models 106 shown in FIG. 1, are presented merely as an example. There may be N number of the plurality of ML models to perform the operations of the disclosed electronic device 102, without departure from the scope of the disclosure.

In an embodiment, each of the plurality of ML models 106 may be implemented as a neural network model, such as, a deep learning model. The neural network model may be defined by its hyper-parameters and topology/architecture. For example, the neural network model may be a deep neural network-based model that may have a number of nodes (or neurons), activation function(s), number of weights, a cost function, a regularization function, an input size, a learning rate, number of layers, and the like. Such a model may be referred to as a computational network or a system of nodes (for example, artificial neurons). For a neural network implementation, the nodes of the neural network model may be arranged in layers, as defined in a neural network topology. The layers may include an input layer, one or more hidden layers, and an output layer. Each layer may include one or more nodes (or artificial neurons). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the neural network model. Node(s) in the final layer may receive inputs from at least one hidden layer to output a result. The number of layers and the number of nodes in each layer may be determined from the hyper-parameters, which may be set before, while, or after training the neural network model on a training dataset.

Each node of the neural network model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node may be updated based on whether an output of the final layer for a given input (from the training dataset) matches a correct result based on a loss function for the neural network model. The above process may be repeated for the same or a different input till a minima of loss function is achieved, and a training error is minimized. Several methods for training are known in the art, for example, gradient descent, stochastic gradient descent, batch gradient descent, gradient boost, meta-heuristics, and the like.

In certain embodiments, each of the plurality of ML models 106 may be based on a hybrid architecture of multiple Deep Neural Networks (DNNs). Examples of each of the plurality of ML models 106 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the neural network model may include, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a Residual Neural Network (Res-Net), a Feature Pyramid Network (FPN), a temporal-frequency attention based convolutional neural network model (TFCNN), and/or a combination thereof.

The server 108 may include suitable logic, circuitry, interfaces, and code that may be configured to store the received set of inputs, the source audio signal, and a first audio signal. In some embodiments, the server 108 may be configured to train and store each of the plurality of ML models 106. The server 108 may be configured to store the output information which may be generated based on different operations selected based on the received set of inputs. In an embodiment, the server 108 may be implemented as a cloud server which may execute operations through web applications, cloud applications, HTTP requests, repository operations, file transfer, and the like. Other examples of the server 108 may include, but are not limited to a database server, a file server, a web server, a media server, an application server, a mainframe server, a cloud server, or other types of servers. In one or more embodiments, the server 108 may be implemented as a plurality of distributed cloud-based resources by use of several technologies that are well known to those skilled in the art. A person of ordinary skill in the art will understand that the scope of the disclosure may not be limited to implementation of the server 108 and the electronic device 102 as separate entities. In certain embodiments, the functionalities of the server 108 may be incorporated in its entirety or at least partially in the electronic device 102, without departure from the scope of the disclosure.

The communication network 110 may include a communication medium through which the electronic device 102, the output device 104, the plurality of ML models 106, and the server 108 may communicate with each other. The communication network 110 may be a wired or wireless communication network. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The UI 112 may be rendered on the electronic device 102 or the output device 104. The UI 112 may be configured to receive the set of user inputs. The UI may be further configured to render the output information. Additionally, the UI 112 may be further configured to display graphical elements that may correspond to user-selectable options for a view selection, a display control, and other interactive user-options. In some embodiments, the UI 112 may be rendered on an external display screen communicatively coupled to the electronic device 102. Details about the UI 112 are provided, for example, in FIG. 3.

In operation, the electronic device 102 may be configured to receive a first user input of the set of user inputs for selection of the source audio signal. The source audio signal may be a composite audio signal that may include the plurality of audio signals (i.e. related to musical instruments and/or vocal signals). The electronic device 102 may further receive a second user input of the set of user inputs for selection of a first operation of the plurality of operations to be performed on the source audio signal based on the received first user input. The electronic device 102 may further receive a third user input of the set of user inputs for selection of at least a first audio signal from the plurality of audio signals. The first input, the second input, and the third input may be received via the UI 112. In an embodiment, the first operation may correspond to, but is not limited to, an extraction of the first audio signal from the source audio signal.

Based on the reception of the first user input and the third user input, the electronic device 102 may be further configured to apply a first ML model 106A of the plurality of ML models 106 on the source audio signal. The electronic device 102 may be further configured to extract at least the first audio signal from the plurality of audio signals in the source audio signal based on the application of the first ML model 106A on the source audio signal. The details of the first ML model 106A are further provided, for example, at FIGS. 4, 5, and 6A. The electronic device 102 may be further configured to apply a second ML model 106B of the plurality of ML models 106 on the extracted first audio signal from the plurality of audio signals. The second ML model 106B may be different from the first ML model 106A and may be applied based on the first operation which may be selected based on the second user input. The electronic device 102 may be further configured to generate output information related to the selected first operation. The output information may be generated based on the application of the second ML model 106B on the extracted the first audio signal. The details of the second ML model 106B are further provided, for example, at FIG. 6A. The electronic device 102 may be further configured to output the generated output information. The output information may include a final audio signal that may be generated based on the extraction of the first audio signal from the source audio signal. The details of the output information (i.e. generated based on the selected operation) are further provided, for example, at FIGS. 6A-6B.

Modifications, additions, or omissions may be made to FIG. 1 without departing from the scope of the present disclosure. For example, the network environment 100 may include more or fewer elements than those illustrated and described in the present disclosure.

Figure 2:
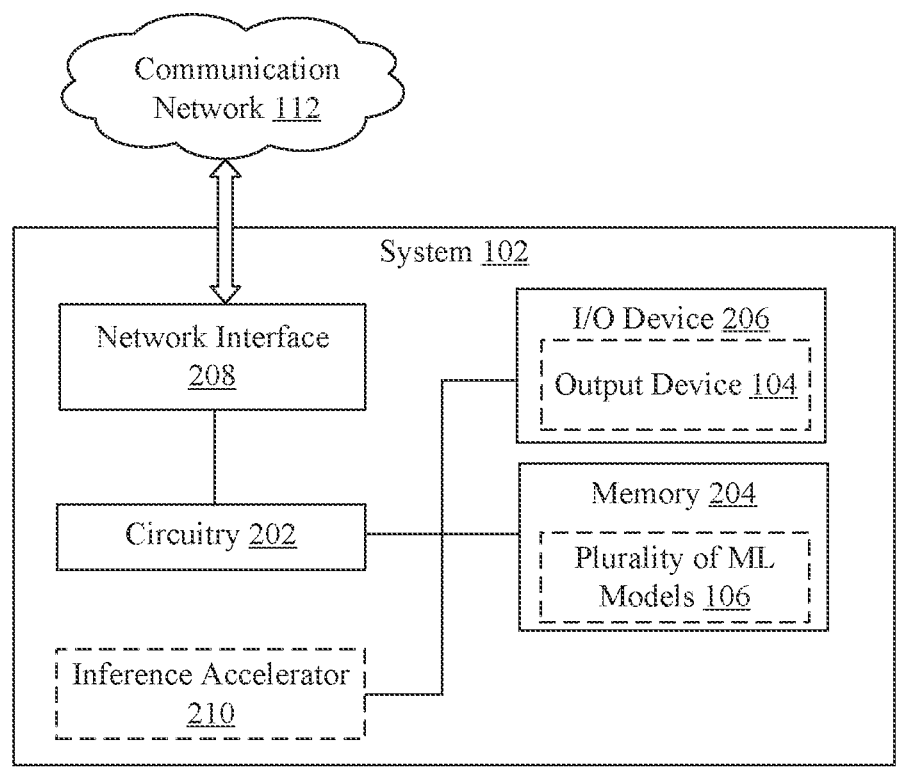
FIG. 2 is a block diagram that illustrates an exemplary electronic device for intelligent audio processing, in accordance with an embodiment of the disclosure.

FIG. 2 is a block diagram that illustrates an exemplary electronic device for intelligent audio processing, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform the plurality of operations for audio processing. The electronic device 102 may further include a memory 204, an input/output (I/O) device 206, a network interface 208, and an inference accelerator 210. The memory 204 may include the plurality of ML models 106. The circuitry 202 may be communicatively coupled to the memory 204, the I/O device 206, the network interface 208, and the inference accelerator 210.

The circuitry 202 may include suitable logic, circuitry, and interfaces that may be configured to execute program instructions associated with different operations to be executed by the electronic device 102. For example, some of the operations may include reception of the set of user inputs, application of the first ML model 106A, extraction of the first audio signal, application of the second ML model 106B, generation of the output information, and outputting the output information. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the set of user inputs, the source audio signal, the plurality of ML models 106, training dataset of the plurality of ML models 106, and the generated output information. The memory 204 may be configured to store information about the selected operation of the plurality of operations associated with the audio processing. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the user input(s) and provide an output based on the received user input(s). For example, the electronic device 102 may be configured to receive the set of user inputs, via the I/O device 206. The I/O device 206 may further render the output information. The I/O device 206 which may include various input and output devices, which may be configured to communicate with the circuitry 202. Examples of the I/O device 206 may include, but are not limited to, the output device 104, a display device, an audio rendering device, a touch screen, a keyboard, a mouse, a joystick, and a microphone.

The network interface 208 may include suitable logic, circuitry, and interfaces that may be configured to facilitate communication between the circuitry 202, the output device 104, the plurality of ML models 106, and the server 108, via the communication network 110. The network interface 208 may be implemented by use of various known technologies to support wired or wireless communication of the electronic device 102 with the communication network 110. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The inference accelerator 210 may include suitable logic, circuitry, interfaces, and/or code that may be configured to operate as a co-processor for the circuitry 202 to accelerate computations associated with the operations of the plurality of ML models 106. For instance, the inference accelerator 210 may accelerate the computations on the electronic device 102 to process the source audio signal in less time than what is typically incurred without the use of the inference accelerator 210. The inference accelerator 210 may implement various acceleration techniques, such as parallelization of some or all of the operations of the plurality of ML models 106. The inference accelerator 210 may be implemented as a software, a hardware, or a combination thereof. Example implementations of the inference accelerator 212 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 3:
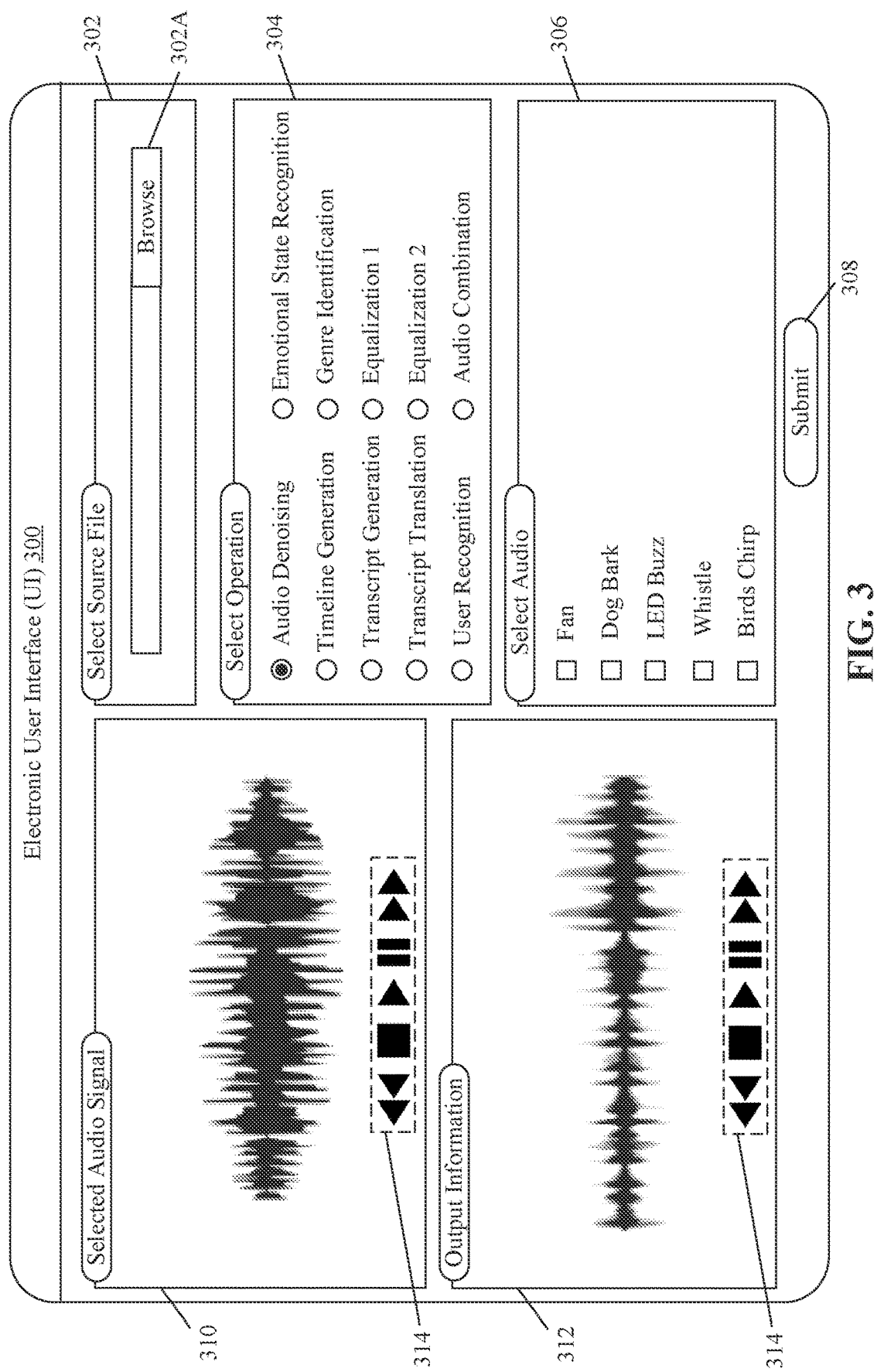
FIG. 3 illustrates an example electronic user interface (UI) to provide a set of user inputs for intelligent audio processing, in accordance with an embodiment of the disclosure.

FIG. 3 illustrates an example electronic user interface (UI) to provide a set of user inputs for intelligent audio processing, in accordance with an embodiment of the disclosure. FIG. 3 is explained in conjunction with elements from FIG. 1 and FIG. 2. With reference to FIG. 3, there is shown a user interface (UI) 300, which may be an example implementation of the UI 112 of FIG. 1. The UI 300 may be displayed on the output device 104 based on a user request, which may be received via an application interface displayed onto a display screen of the output device 104. The application interface may be part of an application software, for example, a software development kit (SDK), a cloud server-based application, a web-based application, an OS-based application/application suite, an enterprise application, a mobile application.

On the UI 300, there are shown a set of UI elements, such as a first UI element 302, a second UI element 304, a third UI element 306, a fourth UI element 308, a fifth UI element 310, and a sixth UI element 312. The first UI element 302 may be labelled as, for example, "Select Source File". The first UI element 302 may include a browse button 302A. Through the browse button 302A, a first user input (i.e. indicating the source audio signal) may be received. The source audio signal may be a composite audio signal that may include a plurality of audio signals and/or a plurality of vocal signals. The second UI element 304 may be labelled as, for example, "Select Operation". The second UI element 304 may indicate the plurality of operations associated with audio processing such as, but not limited to, "Audio Denoising", "Timeline Generation", "Transcript Generation", "Transcript Translation", "User Recognition", "Emotional State Recognition", "Genre Identification", "Equalization 1", "Equalization 2", and "Audio Combination". Within the second UI element 304, a radio button may be present for each of the plurality of operations. Through the second UI element 304 and selection of the corresponding radio button, the circuitry 202 may receive the second user input. The second user input may be for selection of a first operation of the plurality of operations to be performed on the source audio signal. The third UI element 306 may be labelled as, for example, "Select Audio" and may indicate one or more audio signals such as, but are not limited to, an audio signal of "Fan", "Dog Bark", "LED Buzz", "Whistle", and "Birds Chirp". Within the third UI element 306, for example, a checkbox may be present for each of the plurality of pre-defined audio signals. Through the third UI element 306 and the selection of the corresponding checkbox, the third user input may be received for selection of at least a first audio signal from the plurality of audio signals. In an embodiment, the plurality of audio signals may include audio signals of certain objects (such as, but are not limited to, fan, LED buzz, vehicle's horn, siren, whistle, laughter, or animal's roar) that may be recorded along with the source audio signal while recording the source audio signal. The user of the electronic device 102 may select such audio signal of a particular object to be further removed (or attenuated) from the source audio signal. In some embodiments, the third UI element 306 may indicate information about different musical instruments (not shown) which may be selected based on the third user input. The fourth UI element 308 may be labelled as, for example, "Submit" and may correspond to a button. Upon a selection of the button, the electronic device 102 may perform an operation (such as the first operation) of the plurality of operations on the source audio signal.

The fifth UI element 310 may be labelled as, for example, "Selected Audio Signal" and may display a waveform of the selected audio signal (for example selected based on the first user input provided, via the first UI element 302). The sixth UI element 312 may be labelled as, for example, Output Information and may display a waveform of a final audio signal indicated by the output information. As shown in FIG. 3, for example, in the fifth UI element 310 and the sixth UI element 312, a set of playback control buttons 314 may also be displayed. The set of playback control buttons 314 may be used to control the playback of the corresponding audio signal (i.e. source audio signal and the final audio signal). Therefore, the electronic UI 300 of the disclosed electronic device 102 may provide different UI elements (as shown, for example, in FIG. 3), that may be easily operated by a user (i.e. who may not be a specialized person to perform audio processing tasks), to provide different set of inputs to further select different audio processing operations to be performed on a particular audio signal included in the source audio signal (i.e. composite audio signal).

Figure 4:
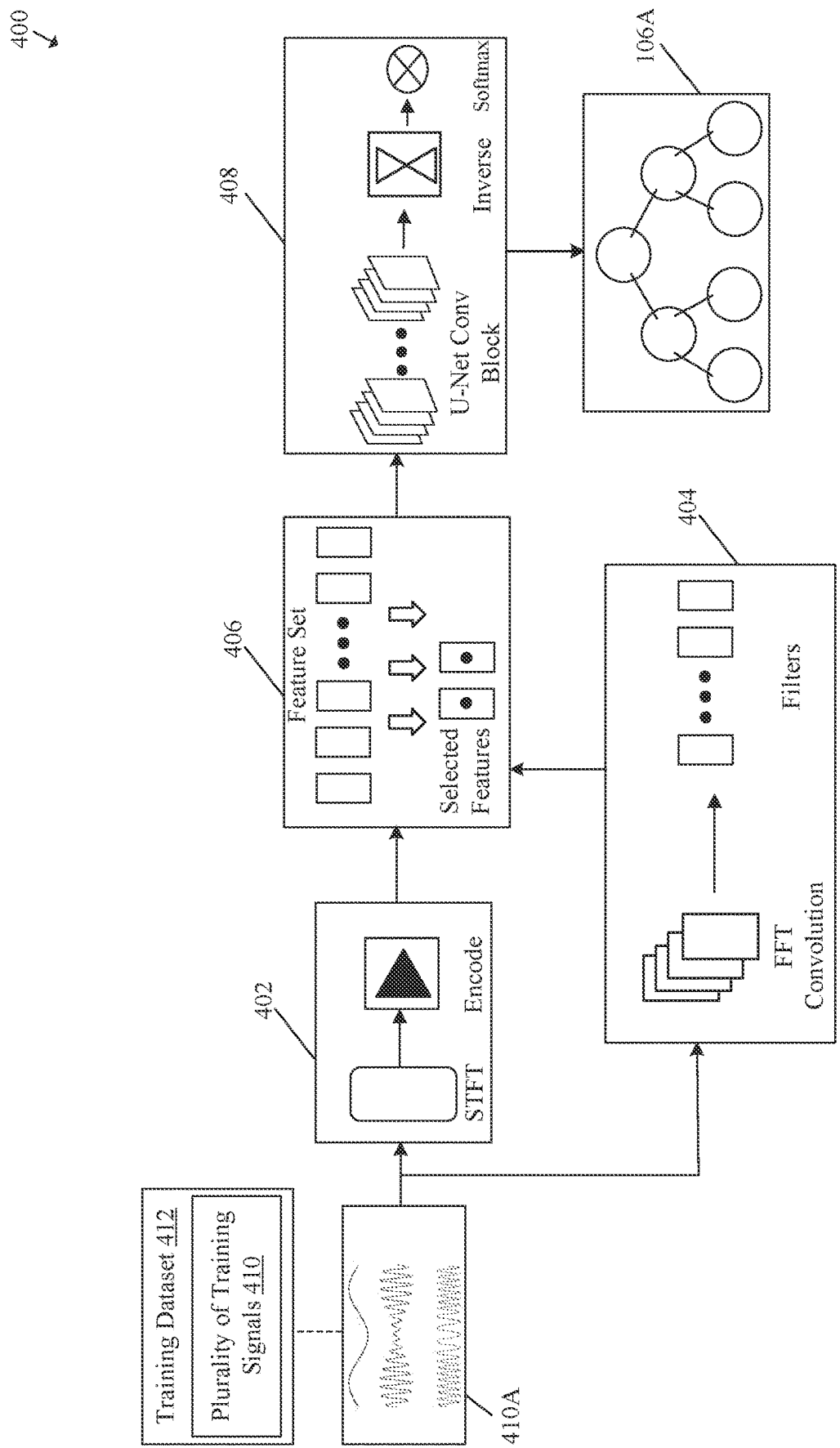
FIG. 4 is a diagram that illustrates training of a first machine learning (ML) model of a plurality of ML models used for the intelligent audio processing, in accordance with an embodiment of the disclosure.

FIG. 4 is a diagram that illustrates training of a first machine learning (ML) model of a plurality of ML models used for the intelligent audio processing, in accordance with an embodiment of the disclosure. FIG. 4 is explained in conjunction with elements from FIG. 1, FIG. 2, and FIG. 3. With reference to FIG. 4, there is shown an operational pipeline 400 of the electronic device 102 that may include a set of blocks (such as operational blocks) to train the first ML model 106A. The set of blocks may include a first block 402, a second block 404, a third block 406, and a fourth block 408. With reference to FIG. 4, there is further shown a plurality of training signals 410, a training dataset 412, and the first ML model 106A of the plurality of ML models 106.

The circuitry 202 may be configured to train the first ML model 106A of the plurality of ML models 106. To train the first ML model 106A, the circuitry 202 may be configured to generate the training dataset 412 on which the first ML model 106A may be trained. In an embodiment, the circuitry 202 may be configured to receive a plurality of training audio signals (such as sample audio signals) associated with a plurality of musical instruments. Each of the plurality of training audio signals may be generated by each of the plurality of musical instruments. Each musical instrument may be a device that may be created or adapted to generate audio signals with specific characteristics. Examples of the plurality of musical instruments may include, but are not limited to, a trumpet, a trombone, a tuba, a guitar, a drum, a french horn, a cornet, a bugle drum, a cymbal, a chime, a tam-tam, a glockenspiel, a timpani, a bell, a xylophone, a violin, a viola, a cello, a bass, a harp, a dulcimer flute, a piccolo, a piano, a clarinet, a recorder, a bassoon, and an oboe. In an embodiment, the plurality of training audio signals may be received via the UI 112.

In another embodiment, the circuitry 202 may be further configured to receive a plurality of training vocal signals that may be associated with a plurality of users (such as different people, for example, singers, celebrities, educators, students, leaders, customers, employees, clients, family, or friends). Specifically, the plurality of training vocal signals (i.e. sample vocal signals) may be sung or spoken by the plurality of users. The plurality of training vocal signals may be received, via the UI 112. In some embodiments, the disclosed electronic device 102 may receive the plurality of training audio signals and the plurality of training vocal signals from different movie/audio production or editing teams. Based on the reception of the plurality of training audio signals and the plurality of training vocal signals, the circuitry 202 may be configured to superimpose a first training audio signal of the plurality of training audio signals with at least one of a second training audio signal of the plurality of training audio signals or with at least one of a first training vocal signal of the plurality of training vocal signals. Specifically, superimposition may correspond to a process of adding new audio/vocal signals over an existing audio/vocal signals without completely erasing or masking the existing audio/vocal signal. The circuitry 202 may be further configured to generate the training dataset 412 based on the superimposition of different audio signals and the vocal signals. The training dataset 412 may include the plurality of training signals 410 which include the plurality of training audio signals and the plurality of training vocal signals. The circuitry 202 may be further configured to train the first ML model 106A with the training dataset 412.

To train the first ML model 106A using a first training signal 410A, the circuitry 202 may provide the first training signal 410A as an input to the first block 402. The first training signal may be mixture signal of the plurality of training audio signals and plurality of training vocal signals and may be represented by equation (1) as follows:

$$M(t) = A \cdot S(t) \quad (1)$$

where,
M(t) represents the first training signal 410A,
A represents a mixing matrix, and
S(t) represents 'n' audio/vocal signal vectors and S(t)= [s1(t), s2(t) ... sn(t)].
The first block 402 may be known as an encoding block in which the first training signal 410A may be encoded. Specifically, the circuitry 202 may apply one or more transformation techniques (as a first function) to encode the first training signal 410A from a time-domain signal to a frequency and time-domain signal: [s1(f, t), s2(f, t) ... sn(f,t)]. The one or more transformation techniques may correspond to, but is not limited to, a Short-time Fourier transform (STFT) technique.

In an embodiment, the circuitry 202 may be further configured to provide the first training signal 410A, as the input to the second block 404. In the second block 404, a second function may be applied on the first training signal 410A to extract one or more audio features of the first training signal 410A. The extracted one or more audio features may include, but are not limited to, a pitch, a spectral density, a tempo, and a Mel-frequency cepstrum. In an embodiment, the circuitry 202 may be configured to apply a convolution operation (such as a Fast Fourier Transform (FFT) convolution operation) to extract the one or more audio features associated with the first training signal 410A. In another embodiment, the second block 404 may correspond to a digital signal processor (DSP) that may be configured to extract the one or more audio features of the first training signal 410A. Therefore, the disclosed electronic device 102 may be a combination of a neural network (or Artificial intelligent engine (AI), or machine learning model) and the digital signal processor (DSP).

The circuitry 202 may be further configured to provide the encoded signal and the extracted one or more audio features as the input to the third block 406, as shown in FIG. 4. The third block 406 may be referred as a feature extraction and selection block. In the third block 406, the circuitry 202 may select at least one feature of the extracted one or more features and generate a vector of encoding for the selected at least one of the extracted one or more audio features. The vector of encoding may be provided as the input to the fourth block 408 as shown, for example, in FIG. 4. The fourth block 408 may be referred as a transformation unit. In the fourth block 408, the first ML model 106A be built and trained for each of the selected features related to the first training signal 410A. In an embodiment, the first ML model 106A may be an invertible u-net model. It may be noted that at least one ML model may be built for each of the selected features related to the first training signal 410A.

In similar manner, the circuitry 202 of the disclosed electronic device 102 may be configured to train the first ML model 106A with selected features related to each of the plurality of training audio signals and the plurality of training vocal signals included in the plurality of training signals. The training of the first ML model 106A for each of the plurality of training signals may include, but is not limited to, encoding of each of the plurality of training signals into a frequency and time domain signal, extraction of one or more audio features associated with each of the plurality of training signals, selection of at least one of the extracted one or more audio features, generation of an encoding vector for the selected at least one feature for each of the plurality of training signals, and training of the first ML model 106A based on the generated encoding vector for each of the plurality of training signals. In some embodiments, the circuitry 202 may train different ML models (similar to the first ML model 106A) for each of the plurality of training signals, where each ML model may be trained on features of different audio signals related to musical instruments and on features of different vocal signals related to different users.

Figure 5:
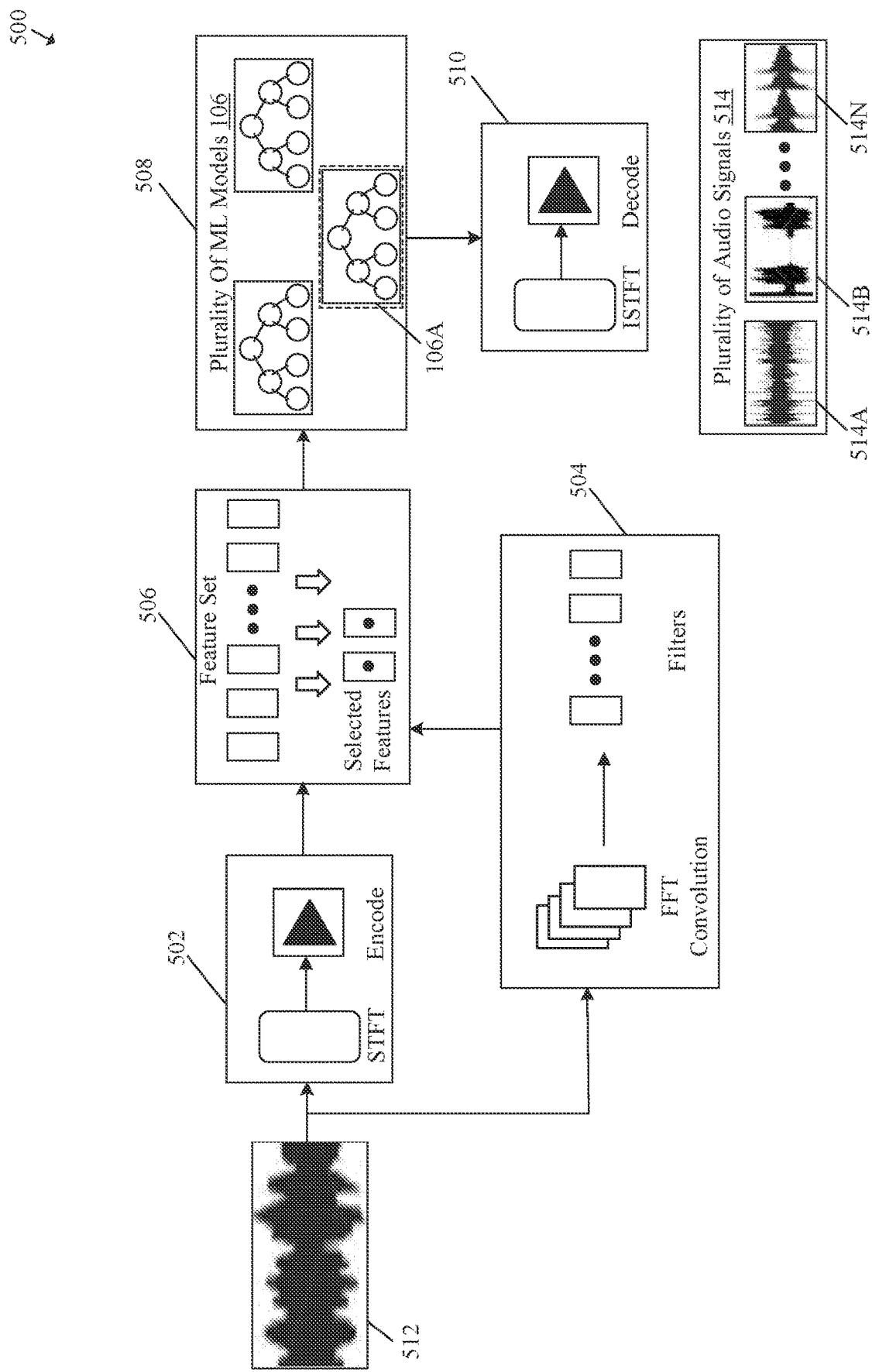
FIG. 5 is a diagram that illustrates extraction of a first audio signal from a composite source audio signal, in accordance with an embodiment of the disclosure.

FIG. 5 is a diagram that illustrates extraction of a first audio signal from a composite source audio signal, in accordance with an embodiment of the disclosure. FIG. 5 is explained in conjunction with elements from FIG. 1, FIG. 2, FIG. 3, and FIG. 4. With reference to FIG. 5, there is shown an operational pipeline 500 of the electronic device 102 that may include a set of blocks (such as operational blocks). The set of blocks may include a first block 502, a second block 504, a third block 506, a fourth block 508, and a fifth block 510. With reference to FIG. 5, there is further shown a first ML model 106A of the plurality of ML models 106.

In real-time scenario, the circuitry 202 may be configured to receive the set of user inputs via the UI 300 (shown in FIG. 3). As discussed above in FIG. 3, the received set of inputs may include the first user input for selection of a source audio signal 512, the second user input for selection of a first operation (i.e. of a plurality of operations) to be performed on the source audio signal 512 selected based on the received first user input, and the third user input for selection of at least a first audio signal 514A from the plurality of audio signals 514. The source audio signal 512 may be a composite (mixed) audio signal that may include the plurality of audio signals 514. In an embodiment, the plurality of audio signals 514 may include the first audio signal 514A, a second audio signal 514B, and an Nth audio signal 514N, where each of the plurality of audio signals 514 may be related to a particular musical instrument or a vocal audio tone/signal.

Based on the reception of the set of user inputs, the circuitry 202 may be configured to provide the source audio signal 512 to the first block 502 and the second block 504 simultaneously. In the first block 502, the circuitry 202 may apply the one or more transformation techniques to encode the source audio signal 512 from the time-domain signal to the frequency and time-domain signal. Further, in the second block 504, the circuitry 202 may extract the one or more audio features associated with the source audio signal 512. The encoded source audio signal and the extracted one or more audio features may be provided as an input to the third block 506 as shown, for example, in FIG. 5. In the third block 506, the circuitry 202 may select at least one audio feature of the extracted one or more features and generate a vector of encoding for each of the selected audio features. The selected audio feature and the corresponding vector of encoding may be further provided as an input to a fourth block 508 as shown, for example, in FIG. 5. The fourth block 508 may be a model selection block. In the model selection block, the first ML model 106A (shown by dotted lines) may be selected from the plurality of ML models 106 based on the selected audio feature and the corresponding vector of encoding for the source audio signal 512. Based on the selection of the first ML model 106A, the disclosed electronic device 102 ensures that a best model may be selected (i.e. using the provided audio features) for the provided source audio signal. The circuitry 202 may be further configured to apply the selected first ML model 106A on the generated vector of encoding. Based on the application of the selected first ML model 106A on the encoding vector, each of the plurality of audio signals 514 may be separated (or extracted). Each of the separated audio signal of the plurality of audio signals 514 may be passed as an input to the fifth block 510 as shown, for example, in FIG. 5. The fifth block 510 may be a decoding block where one or more inverse transformation techniques (such as inverse Short-time Fourier transform (ISTFT)) may applied on each of the separated and encoded audio signal to generate a waveform of the corresponding audio signal. Based on the generated waveform, the circuitry 202 may be configured to extract at least a first audio signal 514A from the plurality of audio signals 514 included in the source audio signal 512.

Figure 6A:
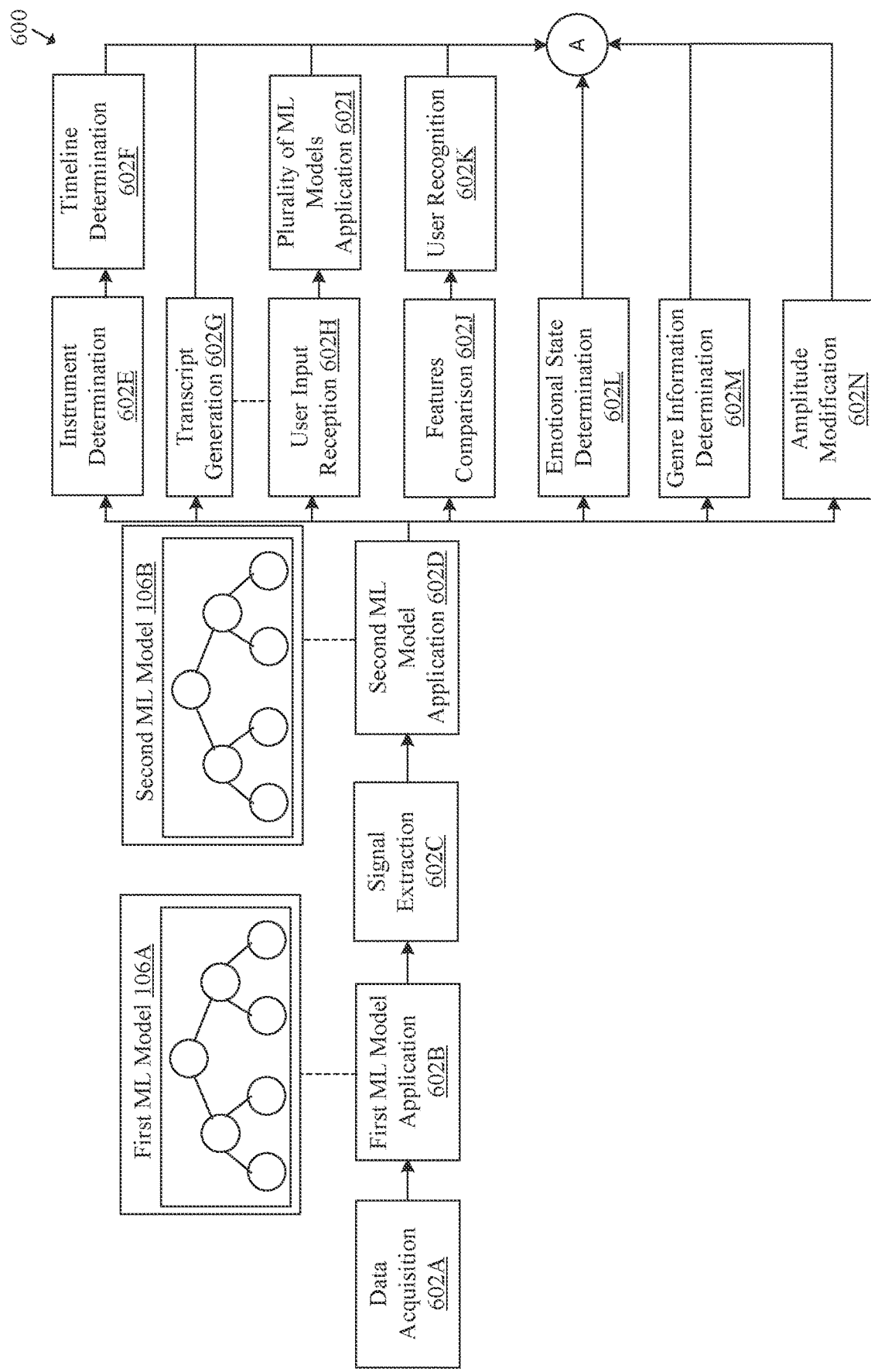

FIGS. 6A and 6B are diagrams that collectively illustrate exemplary operations for intelligent audio processing, in accordance with an embodiment of the disclosure. FIGS. 6A and 6B are explained in conjunction with elements from FIG. 1, FIG. 2, FIG. 3, FIG. 4, and FIG. 5. With reference to FIGS. 6A and 6B, there is shown an operational pipeline 600 that illustrates exemplary operations from 602A to 602P, as described herein. The exemplary operations illustrated in the operational pipeline 600 may start at 602A and may be performed by any computing system, apparatus, or device, such as by the electronic device 102 of FIG. 1 or the circuitry 202 of FIG. 2. Although illustrated with discrete blocks, the exemplary operations associated with one or more blocks of the operational pipeline 600 may be divided into additional blocks, combined into fewer blocks, or eliminated, depending on the particular implementation.

At 602A, a data acquisition operation may be performed. In the data acquisition operation, the circuitry 202 may be configured to receive a set of user inputs. The set of user inputs may include a first user input, a second user input, and/or a third user input. The first user input may be for selection of a source audio signal. The source audio signal may be a composite audio signal and may include a plurality of audio signals (such as the plurality of audio signals 514 shown in FIG. 5). In an embodiment, the source audio signal may be the composite audio signal and may include a plurality of vocal signals. In another embodiment, the source audio signal may include both the plurality of audio signals and the plurality of vocal signals. In an embodiment, the plurality of audio signals may be associated with the one or more musical instruments. In another embodiment, the plurality of audio signals may be associated with one or more animated or in-animated objects such as, but are not limited to, buzzing sounds from electrical instruments, birds chirping sound, a dog barking sound, a vehicle horn, a wind hustling sound, a telephone sound, or any other background noise sound. Similarly, the plurality of vocal signals may be associated with a plurality of users. In an example, the composite audio signal may be formed while recording or capturing a movie scene or a song, where audio/vocal signals related to different source sources are captured.

The second user input may be for selection of an operation of a plurality of operations to be performed on the source audio signal. The second user input may be received based on the received first user input. The plurality of operations may include, but are not limited to, such as, but not limited to, an audio denoising operation, a timeline generation operation (or an event detection operation), a transcript generation operation, a transcript translation operation, a user (i.e. singer) recognition operation, an emotional state recognition operation, a genre identification operation, an equalization operation, and an audio combination operation. In an embodiment, the third user input may be optional and may be required based on the selected operation via the second user input. For example, if the selected operation is the audio denoising operation, then the third user input may be required. As another example, if the selected operation is the timeline generation operation, then the third user input may not be required. The third user input may be for selection of a particular audio signal (i.e. such as the first audio signal 514A shown in FIG. 5) included in the source audio signal. For example, the first audio signal 514A (such as a LED buzz sound, a dog barking sound, or any musical instrument sound) may need to be separated and removed from the source audio signal, in case the selected operation is the audio denoising operation. In some embodiments, the third user input may indicate one or more audio signals in the source audio signal.

At 602B, a first ML model application operation may be performed. In the first ML model application operation, the circuitry 202 may be configured to apply the first ML model 106A of the plurality of ML models 106 on the source audio signal. The first ML model 106A may be applied based on the received set of user inputs. Specifically, the first ML model 106A may be applied based on the reception of the first user input (i.e. indicating the source audio signal), and/or the third user input (i.e. indicating the first audio signal 514A).

At 602C, an audio signal extraction operation may be performed. In the audio signal extraction operation, the circuitry 202 may be configured to extract at least the first audio signal from the plurality of audio signals. The first audio signal may be extracted from the source audio signal based on the application of the first ML model 106A (i.e. selected trained model as described, for example, in FIGS. 4-5) on the source audio signal. In an embodiment, the circuitry 202 may be configured to extract or separate each of the plurality of audio signals and each of the plurality of vocal signals from the source audio signal, based on the application of the first ML model 106A of the plurality of ML models 106 on the received source audio signal.

In another embodiment, the circuitry 202 may be configured to extract one or more audio features associated with the first audio signal of the plurality of audio signals based on the application of the first ML model 106A on the source audio signal. In another embodiment, the circuitry 202 may be configured to extract one or more vocal features associated with at least a first vocal signal of the plurality of vocal signals included in the source audio signal. The one or more audio features and the one or more vocal signals may include, but are not limited to, a Mel-Frequency Cepstral Coefficient (MFCC), a zero-crossing rate, root-mean square energy, a band energy ratio, a spectral roll off, a spectral flux, a spectral entropy, a spectral centroid, a chroma vector, a chroma deviation, a pitch, an amplitude envelope, a tempo (beats per minute), and the like. Therefore, the first ML model 106A may output the separated or extracted audio signals, noise-related signals, or vocal signals included in the source audio signal (i.e. selected based on the first user input). The first ML model 106A may be considered as a core engine of the disclosed electronic device 102 which may be used to separate audio/vocal signals and/or extract audio features of the audio signals in the source audio signal.

At 602D, a second ML model application operation may be performed. In the second ML model application operation, the circuitry 202 may be configured to apply the second ML model 106B of the plurality of ML models 106 on one or more separated or extracted audio signals (such as at least the first audio signal). The second ML model 106B may be applied based on the operation which may be selected based on the second user input. The second ML model 106B may be a trained model which may automatically perform different operations (i.e. as described, for example, in FIG. 3 and at 602A in FIG. 6A), on one or more audio/vocal signals extracted from the source audio signal. In some embodiments, there may be different trained models (i.e. stored in the memory 204) for each operation to be performed on the extracted signal. Such trained models may be referred as post-processing engines, which may perform different audio processing operations (i.e. selected based on the second user input) after the separation or extraction of one or more audio signals from the source audio signal.

At 602E, an instrument determination operation may be performed. In the instrument detection operation, the circuitry 202 may be configured to determine one or more musical instruments that may be associated with each of the extracted plurality of audio signals. The one or more musical instruments may be determined based on the application of the second ML model 106B on the extracted plurality of audio signals. In an embodiment, the second ML model 106B may be trained on a frequency and a pattern of audio signals (like sample audio signals) generated via the one or more musical instruments. In another embodiment, the circuitry 202 may be further configured to determined one or more sources of audio signals that may be generated by one or more users, such as audio signals associated with claps, whistle, etc. For example, a first audio signal may be generated by, but is not limited to, a drum, a piano, and a bass. As another example, a second audio signal may be generated by claps. It may be noted that the instrument determination operation may be performed only if a second operation of the plurality of operations may be selected (via the second user input) as the instruments determination or as the generation of a timeline.

At 602F, a timeline generation operation may be performed. In the timeline generation operation, the circuitry 202 may be configured to determine a timestamp. The circuitry 202 may be configured to determine the timestamp for each of the extracted plurality of audio signals and the extracted plurality of vocal signals in the source audio signal. The determined timestamp may indicate a starting time and an ending time of each of the extracted plurality of audio signals and the extracted plurality of vocal signals in the source audio signal. In an embodiment, multiple timestamps may be generated for different audio/vocal signals based on corresponding occurrences in the source audio signal. Similar to the instrument determination operation, the timeline generation operation may be performed only if the second operation of the plurality of operations may be selected (via the second user input, as shown in FIG. 3)) as the timeline generation operation. The circuitry 202 may be further configured to determine the timeline based on the determined timestamp for each of the extracted audio/vocal signals from the source audio signal. The generated timeline may indicate to a user, the exact timestamps (i.e. starting and ending timings) of different occurrences of each audio/vocal signal extracted from the source audio signal. An exemplary generated timeline is provided, for example, at 602O in FIG. 6B.

At 602G, a transcript generation operation may be performed. In the transcript generation operation, the circuitry 202 may be configured to generate a transcript (i.e. subtitles or closed captions) of an extracted first vocal signal of the plurality of vocal signals in the source audio signal. The circuitry 202 may be configured to apply the second ML model 106B on the extracted first vocal signal to generate a first textual file that may include the transcript of the extracted first vocal signal. In an embodiment, the second ML model 106B may include a speech to text engine that may be configured to generate the transcript of the first vocal signal. In an embodiment, the circuitry 202 may be configured to generate the transcript for each of the plurality of vocal signals separated from the source audio signal. The generated transcript may be in first language (for example, in English) and may be rendered as subtitle or lyrics corresponding to the first vocal signal. It may be noted that the transcript generation operation may be performed only if a third operation of the plurality of operations may be selected via the second user input (as shown in FIG. 3). The third operation may correspond to the generation of a transcription of at least the first vocal signal of the plurality of vocal signals included in the source audio signal. As the extracted first vocal signal may be free from any background noise (or any audio tone), the generated transcript (or translation) may be more accurate.

At 602H, a user input reception operation may be performed. In the user input reception operation, the circuitry 202 may be configured to receive a fourth user input. The fourth user input may be received, via the UI 112 and may be for selection of a second language for the translation of the generated transcript of the extracted first vocal signal from the first language to the second language. In another embodiment, the circuitry 202 may be configured to receive a fifth user input. The fifth user input may be received (via the UI 112) and may be for selection of a third audio signal and a fourth audio signal. The third audio signal may be associated with a first musical instrument and the fourth audio signal may be associated with a second musical instrument. It may be noted that the user input reception operation may be performed only if a fourth operation (i.e. transcript translation operation) and/or a tenth operation (i.e. audio combination operation) of the plurality of operations may be selected, via the second user input (as shown in FIG. 3). Specifically, the fourth user input may be received when the fourth operation may be selected, and the fifth user input may be received when the tenth operation may be selected. The fourth operation may correspond to the translation of the transcription and the tenth operation may correspond to a combination of at least two audio signals.

At 602I, a plurality of ML models application operation may be performed. In the plurality of ML models application operation, the circuitry 202 may be configured to apply the plurality of ML models 106 on the received user inputs. Specifically, the circuitry 202 may be configured to apply a third ML model of the plurality of ML models 106 on the first textual file that may include the transcript of the first vocal signal in the first language. The circuitry 202 may apply the third ML model on the first textual file based on the reception of the second user input (i.e. indicating translation operation) and the fourth user input (i.e. indicating second language for translation). The third ML model may be trained to translate content of the first textual file from the first language to the second language. In an embodiment, the third ML model may be trained based on a neural machine translation technique. The detailed implementation of the aforementioned machine translation technique may be known to one skilled in the art, and therefore, a detailed description for the aforementioned technique has been omitted from the disclosure for the sake of brevity.

In another embodiment, the circuitry 202 may be configured to apply the plurality of ML models 106 on the received third audio signal and on the received fourth audio signal based on the reception of the second user input (i.e. indicating audio combination operation) and the fifth user input. The circuitry 202 may apply the plurality of ML models 106 to combine the third audio signal and the fourth audio signal to form a combined (composite) audio file. For example, the user of the disclosed electronic device 102 may want to combine audio signals of different musical instruments (for example a guitar and a piano) to generate the combined audio file. In another example, in case the user wants to add new musical instrument notes or audio tones in the source audio signal (i.e. composite audio signal), then the third user input may be an indicative of the source audio signal and the fourth user input may be an indicative of an audio signal or a file related to the new musical instrument which has to be combined with the source audio signal. In such case, the circuitry 202 may receive a user input which may indicate different positions or time periods of the source audio signal where the audio signal related to the new musical instruments has to be combined. Based on the combination of different audio signals, a remix or re-mastering audio operation may be performed by the disclosed electronic device 102. It may be noted that the third ML model may be applied on the first textual file only if the fourth operation is selected via the second user input (as shown in FIG. 3). Also, the plurality of ML models 106 may be applied on the received third audio signal and on the received fourth audio signal only if the tenth operation is selected via the second user input.

At 602J, a features comparison operation may be performed. In the features comparison operation, the circuitry 202 may be configured to compare the extracted one or more audio features (such as one or more first features) associated with the first vocal signal with one or more features stored in a feature database. The first vocal signal may be associated with a particular singer (such as a first user) and may be extracted from the source audio signal (for example at 602C in FIG. 6A). The one or more features stored in the feature database may be associated with each of the plurality of users (i.e. many singers or people). For example, the one or more features stored in the feature database may related to different audio sample features related to the variety of singers and people. It may be noted that the features comparison operation may be performed only if the fifth operation of the plurality of operations may be selected via the second user input (as shown in FIG. 3). The fifth operation may correspond to a recognition of the first user in the source audio signal. In some embodiments, the fifth operation may correspond to recognition of multiple singers whose voices are included in the source audio signal. In such case, multiple vocal signals may be extracted from the source audio signal and one or more audio features related to each vocal signal may be compared with the sample audio features stored in the feature database.

At 602K, a user recognition operation may be performed. In the user recognition operation, the circuitry 202 may be configured to recognize the first user (i.e. for example a singer). The circuitry 202 may be configured to recognize the first user based on the comparison of audio features. In case, the one or more first features related to the first vocal signal matches with at least one of the one or more features stored in the feature database, an identifier associated with the match features may be extracted from the feature database, and the extracted identifier may be associated with the first user. The disclosed electronic device 102 may possess the capability to determine or recognize the first user (i.e. a singer of a vocal signal in the source audio signal) based on the features associated with the vocal features of the corresponding user. This may be further useful in identification of customers or clients of a business (i.e. such in a call center business), where the audio features of the first vocal signal of a particular customer may be compared with sample audio features of different customers stored in an internal feature database. Further, based on the identification of the customer, previous call histories or interactions of the same customer may be retrieved to quickly understand customer's profile, preferences, context, or problems. The disclosed electronic device 102 may possess the capability to recognize the customer and provide such past information about the recognized customers to an operator (or to an executive) of the business, to further reduce a turn-around-time to provide relevant solutions to current problems/concerns raised by the customers. Similar to the features comparison operation, the user recognition operation may be performed only if the fifth operation of the plurality of operations may be selected via the second user input (as shown in FIG. 3). In an embodiment, the second ML model 106B may be trained to compare sample audio features stored in the feature database with the audio features of the first vocal signal (i.e. extracted from the source audio signal by the first ML model 106A, for example, at 602B-602C, in FIG. 6A). Such operation to recognize the customers (or singers) based on the comparison of audio features may be referred as an audio fingerprint matching operation.

At 602L, an emotional state determination operation may be performed. In the emotional state determination operation, the circuitry 202 may be configured to determine an emotional state of the first user (i.e. recognized at 602K by the disclosed electronic device 102). The circuitry 202 may be configured to determine the emotional state of the first user (in the source audio signal, for example, while recording the first vocal signal or the source audio signal) based on the application of the second ML model 106B on the extracted one or more first features (i.e. audio features) associated with the first vocal signal (i.e. audio related to a particular singer or a person whose voice is in the source audio signal). For example, the second ML model 106B may be trained based on different audio features to determine the emotional state represented by a singer while recording a vocal audio file or the source audio signal. In an embodiment, the determined emotional state of the first user may be one of a happy emotional state, a sad emotional state, an angry emotional state, a calm emotional state, a fear emotional state, a neutral emotional state, an excited emotional state, a confused emotional state, a stressed emotional state, a disgusted emotional state, a surprised emotional state, an excitement emotional state, or a scared emotional state. In some embodiments, the circuitry 202 may determine multiple emotional states of the first user (i.e. of a particular singer) during complete duration of the first vocal signal extracted from the source audio signal. For example, while recording the source audio signal, the first user may have sung some portions of a song in the happy emotional state and remaining portions in the sad emotional state. It may be noted that the emotional state determination operation may be performed only if the sixth operation (i.e. an emotional state recognition operation) of the plurality of operations may be selected via the second user input (as shown in FIG. 3). The sixth operation may correspond to the determination of the emotional state of the first user.

At 602M, a genre information determination operation may be performed. In the genre information determination operation, the circuitry 202 may be configured to determine genre information (i.e. indicating a genre) that may be associated with the one or more audio signals extracted from the source audio signal. The genre information may be determined based on the application of the second ML model 106B on the extracted one or more audio features associated with one or more audio signals of the plurality of audio signals. The genre information may include a genre of the one or more audio signals. In an embodiment, the genre information may further include subgenre associated with the genre of the one or more audio signals. Examples of the genre may include, but are not limited to, pop, blues, rock, jazz, hip hop, latin, electronic, dance, country, folk, acoustic, classical, metal, jazz, blues, traditional, carnatic, bhajan, and new age. For example, in case the source audio signal includes audio signals related to a particular combination of musical instruments, then the trained second ML model 106B may analyze different audio features (i.e. related to audio signals of the musical instruments extracted from the source audio signal) to determine the genre of sound produced by the combination of the musical instruments represented in the source audio signal. In some embodiments, the circuitry 202 may utilize multiple trained models of the plurality of ML models 106 to be applied on the combination of the extracted audio signals to determine the genre. In such case, each ML model may be trained on the audio features related to a particular musical instrument. It may be noted that the genre information determination operation may be performed only if a seventh operation of the plurality of operations may be selected via the second user input (as shown in FIG. 3). The seventh operation may correspond to a genre identification operation.

At 602N, an amplitude modification operation may be performed. In the amplitude modification operation, the circuitry 202 may be configured to modify an amplitude of the extracted first audio signal in the source audio signal. The first audio signal may be extracted from the source audio signal as described, for example, at 602C in FIG. 6A. The circuitry 202 may be configured to modify the amplitude of the extracted first audio signal based on the application of the second ML model 106B on the extracted first audio signal. The modification of the amplitude of the extracted first audio signal may corresponds to an increase in the amplitude of the extracted first audio signal. In some embodiments, the circuitry 202 may extract a second audio signal (i.e. selected based on the third user input) from the source audio signal and may further apply the second ML model 106B on the extracted second audio signal to modify the amplitude of the extracted second audio signal. In an embodiment, the modification of the amplitude of the extracted second audio signal may correspond to a decrease in the amplitude of the extracted second audio signal. In another embodiment, the modification of the amplitude of the extracted second audio signal may correspond to an increase in the amplitude of the extracted second audio signal. In another embodiment, the circuitry 202 may be configured to analyze the first audio signal and the second audio signal of the plurality of audio signals and further increase the amplitude of the first audio signal and decrease the amplitude of the second audio signal based on a source of the first audio signal and the second audio signal respectively. For example, in a movie scene if the first audio signal corresponds to a gunshot/explosion and an amplitude of a background audio signal (i.e. background audio) is low, then the amplitude of the first audio signal may remain same. As another example, in the movie scene if the second audio signal corresponds to a yelling sound and an amplitude of a background audio signal (i.e. background audio) is high, then the amplitude of the second audio signal may be increased. In an embodiment, the modification of the amplitude of the first audio signal may correspond to a normalization of the first audio signal of the plurality of audio signals. It may be noted that the amplitude modification operation may be performed only if an eighth or a ninth operation of the plurality of operations may be selected via the second user input (as shown in FIG. 3). The eight and the ninth operation may correspond to an equalization (i.e. or normalization) of the source audio signal. In some embodiments, the circuitry 202 may receive the third user input (via the I/O device 206) which may indicate multiple audio signals (i.e. related to different musical instruments or vocals) in the source audio signal and receive the second user input to select either of the eighth operation or the ninth operation to equalize or normalize specific audio signals extracted from the source audio signal (using the first ML model 106A as described, for example, at 602C in FIG. 6A). For example, as per the received set of inputs for the composite audio signal, an audio signal related to a guitar may only be amplified to a certain amplitude and an audio signal related to drums may only be attenuated to a certain amplitude as per audio processing requirement desired by the user of the disclosed electronic device 102. Therefore, based on a capability to equalize desired audio signals in the composite audio signal, the remix or re-mastering operation may be provided by the disclosed electronic device 102. In an embodiment, the electronic device 102 may perform multiple operations (one after the other) on same composite audio signal, for example, a particular audio signal or vocal signal may be extracted, equalized, and then further combined with other separated audio/vocal signals to again form the composite audio signal (i.e. with a selected audio/vocal signal equalized or normalized).

At 602O, an output information generation operation may be performed. In the output generation operation, the circuitry 202 may be configured to generate output information. The generated output information may be related to the operation selected via the second user input. Specifically, the generated output information may vary with the operation as selected via the second user input.

In case, the selected operation is the first operation that corresponds to the to the removal of the extracted first audio the equalization of a particular audio signal (i.e. extracted first audio signal from the source audio signal). For example, as per the set of user inputs, the source audio signal may be equalized (i.e. volume gain control or SNR operation) leaving out the equalization of some exceptional sounds (for example, but are not limited to, a gun-shot, an explosion) included in the source audio signal In such case, the output information generated by the disclosed electronic device 102 may indicate the final audio signal which includes equalized audio signals (i.e. of the plurality of audio signals in the source audio signal) which are other than the exception sound signal (i.e. extracted first audio signal). Therefore, even if the volume of a particular movie scene (i.e. composite audio signal) may be reduced, still the volume of certain exceptional sounds (for example gun-shot, explosions) selected from the movie scene may be maintained by the user, using the disclosed electronic device 102.

In case, the selected operation is the second operation that corresponds to generation of a timeline, the output information may be generated based on the determined one or more musical instruments, and the determined timestamp (i.e. described, for example, at 602E and 602F in FIG. 6A). The generated output information may indicate a timeline. In an embodiment, the generated timeline may be in a tabular format. Example of the generated timeline is presented in Table 1, as follows:

TABLE 1

| | Timeline | | | | | |
|---|---|---|---|---|---|---|
| | Time (sec) | | | | | |
| Source | 00:00:00-00:10:00 | 00:10:00-00:20:00 | 00:20:00-00:30:00 | 00:30:00-00:40:00 | 00:40:00-00:50:00 | 00:50:00-00:60:00 |
| Clap | No | No | No | Yes | Yes | No |
| Drum | Yes | No | No | Yes | Yes | No |
| Vocal | No | Yes | Yes | Yes | No | Yes |
| Piano | Yes | No | No | No | No | Yes |
| Whistle | No | No | No | No | Yes | Yes |
| Guitar | Yes | No | No | No | No | No | signal from the source audio signal, the output information may be generated based on the application of the second ML model 106B on the extracted first audio signal. The generated output information may indicate a final audio signal that may be generated based on the removal of the extracted first audio signal from the source audio signal. As the final audio signal may be an audio signal with the removal of the selected first audio signal from the source audio signal, the first operation may represent an audio denoising operation or a remix operation, where the first audio signal may be selected based on the third user input. For example, the first audio signal may be a sound of LED buzz sound which may be included in the composite audio signal (such as a recorded song). Thus, the final audio signal may indicate a noise-free audio signal or a filtered audio signal (as the output) without the sound of the selected first audio signal (i.e. LED buzz sound).

In certain embodiments, the received third user input may indicate an audio signal (such as an audio of an exceptional audio source) which may not be equalized, at the time of equalization of complete composite audio signal. In such case, the second user input may indicate an operation (as the first operation) based on which, the source audio signal may be equalized (for example to a particular amplitude), without In case, the selected operation is the third operation that corresponds to generation of the transcription (as described, for example, at 602G), the output information may be generated based on the application of the second ML model on the extracted first vocal signal. The generated output information may indicate the first textual file that may include the transcription of the extracted first vocal signal in the textual format in the first language. In such case, the generated output information may indicate a storage location, a filename, a size, and/or the first language of the first textual file.

In case, the selected operation is the fourth operation that corresponds to translation of the transcription (as described, for example, at 602I), the output information may be generated based on the application of the third ML model on the first textual file. The generated output information may indicate the second textual file that may include the transcription of the extracted first vocal signal in the second language. In such case, the generated output information may indicate a storage location, a filename, a size, and/or the second language of the translated first textual file.

In case, the selected operation is the fifth operation that corresponds to the recognition of the first user (as described, for example, at 602K), the output information may be generated based on the recognition of the first user (i.e. such as a singer or a person whose voice is included in the source audio signal). The recognition of the first user may be based on the comparison of the extracted one or more first features associated with the first vocal signal of the first user with the one or more features stored in the feature database. The generated output information may indicate the identifier of the recognized first user. The identifier of the recognized first user may indicate, but is not limited to, a name of the recognized user, contact details of the recognized user, information about past experience and accomplishment of the recognized user, past records or interactions related to the recognized user, or information about current or upcoming events related to the recognized user.

In case, the selected operation is the sixth operation that corresponds to the determination of the emotional state of the first user (as described, for example, at 602L), the output information may be generated based on the application of the second ML model 106B on the extracted one or more first features associated with the first vocal signal of the first user. The generated output information may indicate the determined emotional state of the first user.

In case, the selected operation is the seventh operation that corresponds to the genre identification (as described, for example, at 602M), the output information may be generated based on the application of the second ML model on the extracted one or more audio features associated with the one or more audio signals. The generated output information may indicate the determined genre information related to one or more audio signals selected from the source audio signal based on the received third user input.

In case, the selected operation is the eighth or ninth operation that corresponds to the equalization of the source audio signal (as described, for example, at 602N), the output information may be generated based on the application of the second ML model on the extracted first audio signal or multiple audio signals. The generated output information may indicate the equalized source audio signal that may include the modified first audio signal. In such case, the generated output information may further indicate, but is not limited to, information about the modified sound of particular instruments, or information about the modified amplitudes. In some embodiments, the generated output information may further indicate a storage location, a filename, a size, and/or a duration of an equalized audio signal. In some embodiments, the generated output information may provide different playback options (as shown by the sixth UI element 312 in FIG. 3) to render the equalized audio signal.

In case, the selected operation is the tenth operation that corresponds to a combination of at least two audio signals (as described, for example, at 602I), the output information may be generated based on the application of the plurality of ML models 106 on the received third audio signal and on the received fourth audio signal. The generated output information may indicate a combined audio signal that may include the combination of the third audio signal and the fourth audio signal. In such case, the generated output information may further indicate a storage location, a filename, a size, and/or a duration of an audio file (i.e. such as a remix audio file) related to the combined audio signal. In some embodiments, the generated output information may provide different playback options to render the audio file related to the combined audio signal.

At 602P, an output information rendering operation may be performed. In the output information rendering operation, the circuitry 202 may be configured to control the output device 104 to render the generated output information. In an embodiment, the generated output information may be rendered via the UI 112 that may be displayed on the output device 104. In another embodiment, the generated output information may be rendered via one or more audio output devices (such as a speaker) that may be associated with the output device 104. In an embodiment, the generated output information may be rendered via both the UI 112 and the one or more audio output devices.

As an example, if the selected operation is the first operation (i.e. the audio denoising operation), the eighth operation or the ninth operation (i.e. audio equalization operation), or the tenth operation (i.e. audio combination operation), then the circuitry 202 may be configured to control the one or more audio output devices of the output device 104 to render the generated output information. As another example, if the selected operation is the second operation (i.e. timeline generation operation), or the third operation (i.e. transcription generation operation), or the fourth operation (i.e. transcription translation operation), or the fifth operation (i.e. user recognition operation), or the sixth operation (i.e. emotional state recognition operation), or the seventh operation (i.e. genre identification operation), the circuitry 202 may be configured to control the UI 112 displayed on the output device 104 to render the generated output information. As another example, if the selected operation is the fifth operation or the sixth operation or the seventh operation, the circuitry 202 may be configured to control both the one or more audio output devices and the UI 112 of the output device 104 to render the generated output information. Therefore, the disclosed electronic device 102 is capable to automatically and intelligently perform variety of audio processing operations (using trained plurality of ML models 106 as described in FIGS. 6A-6B) and may be easier for users to operate, as compared to the traditional tools that may require intervention from specialized audio engineers or from any person with certain sound processing experience. Hence, the disclosed electronic device 102 and the method may be an inexpensive solution in comparison to the traditional tools that are known in the art for audio processing. The user of the disclosed electronic device 102 may choose different audio signals (for example for elimination, combination, equalization, genre determination, transcript generation, singer recognition, or other processing operation) and select between multiple operations, as shown in FIG. 3, to easily perform the desired audio processing operation.

Figure 7:
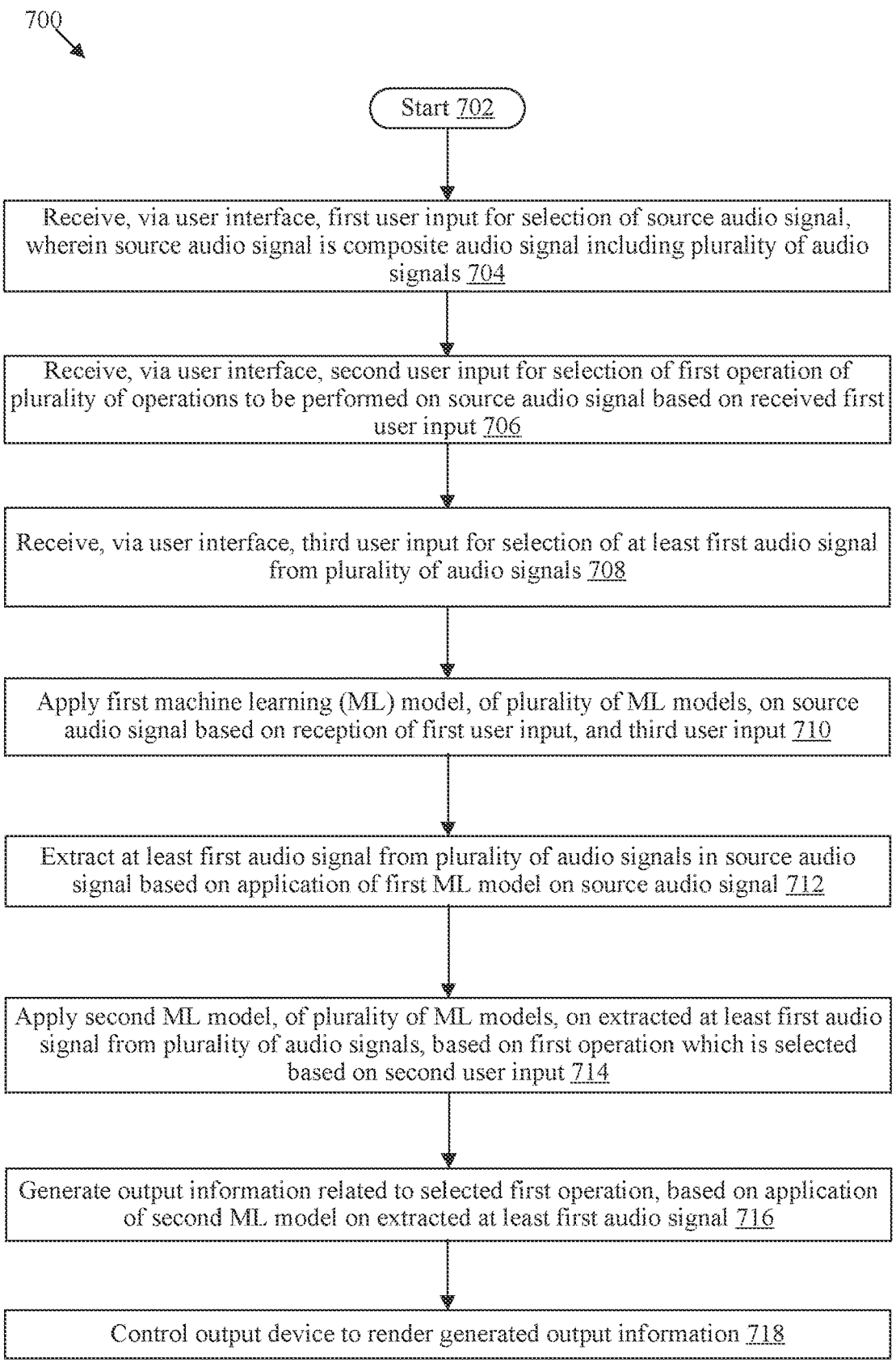
FIG. 7 is a flowchart that illustrates exemplary operations for intelligent audio processing, in accordance with an embodiment of the disclosure.

FIG. 7 is a flowchart that illustrates exemplary operations for intelligent audio processing, in accordance with an embodiment of the disclosure. FIG. 7 is explained in conjunction with elements from FIG. 1, FIG. 2, FIG. 3, FIG. 4, FIG. 5, FIG. 6A, and FIG. 6B. With reference to FIG. 7, there is shown a flowchart 700. The operations from 702 to 718 may be implemented on any computing device, for example, the electronic device 102 or the circuitry 202. The operations may start at 702 and proceed to 704.

At 704, the first user input for selection of the source audio signal may be received via the user interface 112, wherein the source audio signal may be a composite audio signal that may include a plurality of audio signals. In one or more embodiments, the circuitry 202 may be configured to receive, via the user interface 112, the first user input for selection of the source audio signal, wherein the source audio signal may be the composite audio signal that may include the plurality of audio signals. The details about the reception of the first user input are provided for example, in FIGS. 1, 3, and 6A (for example at 602A).

At 706, the second user input for selection of the first operation of the plurality of operations (i.e. to be performed on the source audio signal) may be received via the user interface 112 based on the received first user input. In one or more embodiments, the circuitry 202 may be configured to receive, via the user interface 112, the second user input for selection of the first operation (or any other audio processing operation as shown in FIG. 3) of the plurality of operations to be performed on the source audio signal based on the received first user input. The details about the reception of the second user input are provided for example, in FIGS. 1, 3, and 6A (for example at 602A).

At 708, the third user input for selection of at least the first audio signal from the plurality of audio signals may be received, via the user interface 112. In one or more embodiments, the circuitry 202 may be configured to receive, via the user interface, the third user input for selection of at least the first audio signal from the plurality of audio signals. The details about the reception of the third user input are provided for example, in FIGS. 1, 3, and 6A (for example at 602A).

At 710, the first machine learning (ML) model 106A of the plurality of ML models 106 may be applied on the source audio signal based on the reception of the first user input, and the third user input. In one or more embodiments, the circuitry 202 may be configured to apply the first machine learning (ML) model 106A of the plurality of ML models 106 on the source audio signal based on the reception of the first user input and the third user input. The details about the first ML model 106A are provided for example, in FIGS. 1, 4, 5, and 6A (at 602B).

At 712, at least the first audio signal from the plurality of audio signals in the source audio signal may be extracted based on the application of the first ML model 106A on the source audio signal. In one or more embodiments, the circuitry 202 may be configured to extract at least the first audio signal from the plurality of audio signals in the source audio signal, based on the application of the first ML model 106A on the source audio signal. The details about the extraction of the first audio signal are provided for example, in FIGS. 1 and 6A (at 602C).

At 714, a second ML model 106B of the plurality of ML models 106 may be applied on the extracted at least first audio signal from the plurality of audio signals based on the first operation which may be selected based on the second user input. In one or more embodiments, the circuitry 202 may be configured to apply the second ML model 106B of the plurality of ML models 106 on the extracted at least first audio signal from the plurality of audio signals, based on the first operation (or any other operation shown in FIG. 3) which is selected based on the second user input. The details about the second ML model 106B and related application for the selected operation are provided for example, in FIGS. 1 and 6A (at 602D-602N).

At 716, the output information related to the selected first operation may be generated based on the application of the second ML model on the extracted at least first audio signal. In one or more embodiments, the circuitry 202 may be configured to generate the output information related to the selected operation (like the first operation or any other operation shown in FIG. 3) based on the application of the second ML model 106B on the extracted at least first audio signal. The details about the generation of the output information are provided for example, in FIGS. 1, 3, and 6B (at 602O).

At 718, the output device 104 may be controlled to render the generated output information. In one or more embodiments, the circuitry 202 may be configured to control the output device 104 to render the generated output information as described, for example, at 602P. Control may pass to end.

Various embodiments of the disclosure may provide a non-transitory computer-readable medium and/or storage medium having stored thereon, computer-executable instructions executable by a machine and/or a computer such as the electronic device 102. The computer-executable instructions may cause the machine and/or computer to perform operations that may include reception of a first user input for selection of a source audio signal via a user interface (such as the user interface 112). The source audio signal may be a composite audio signal that may include a plurality of audio signals. The operations may further include reception of a second user input (via the UI 112) for selection of a first operation of a plurality of operations to be performed on the source audio signal selected based on the received first user input. The operations may further include reception of a third user input (via the UI 112) for selection of at least a first audio signal from the plurality of audio signals input. The operation may further include application of a first machine learning (ML) model (such as the first ML model 106A) of the plurality of ML models (such as the plurality of ML models 106) on the source audio signal based on the reception of the first user input, and the third user input. The operations may further include extraction of at least the first audio signal from the plurality of audio signals in the source audio signal based on the application of the first ML model on the source audio signal. The operations may further include application of a second ML model (such as the second ML model 106B) of the plurality of ML models on the extracted at least first audio signal from the plurality of audio signals, based on the first operation which may be selected based on the second user input. The operations may further include generation of output information related to the selected first operation, based on the application of the second ML model on the extracted at least first audio signals. The operations may further include control of an output device (such as the output device 104) to render the generated output information.

Exemplary aspects of the disclosure may include a system (such as the electronic device 102 of FIG. 1) that may include circuitry (such as the circuitry 202 of FIG. 2). The circuitry may be configured to receive a first user input for selection of a source audio signal (such as the source audio signal 512 of FIG. 5) via a user interface such as UI 112 of FIG. 2). The source audio signal may be a composite audio signal that may include a plurality of audio signals (such as the plurality of audio signals 514 of FIG. 2). The circuitry may receive a second user input for selection of a first operation of a plurality of operations to be performed on the source audio signal based on the received first user input. The second user input may be received via the user interface. The circuitry may further receive a third user input for selection of at least a first audio signal (such as the first audio signal 514A in FIG. 5) from the plurality of audio signals via the user interface. The circuitry may further apply a first machine learning (ML) model (such as the first ML model 106A) of a plurality of ML models (such as the plurality of ML models 106 of FIG. 1) on the source audio signal based on the reception of the first user input and the third user input. The circuitry may further extract at least the first audio signal from the plurality of audio signals in the source audio signal based on the application of the first ML model on the source audio signal. The circuitry may further apply a second ML model (such as the second ML model 106B of FIG. 2) of the plurality of ML models on the extracted at least first audio signal from the plurality of audio signals based on the first operation which is selected based on the second user input. The circuitry may further generate output information related to the selected first operation based on the application of the second ML model on the extracted at least first audio signal. The circuitry may further control an output device (such as the output device 104) to render the generated output information.

In accordance with an embodiment, the first operation corresponds to a removal of the extracted at least first audio signal from the source audio signal, and wherein the output information indicates a final audio signal generated based on the removal of the extracted at least first audio signal from the source audio signal.

In accordance with an embodiment, the circuitry may be further configured to receive, via the user interface, the second user input for selection of a second operation of the plurality of operations to be performed on the source audio signal. The second operation may correspond to generation of a timeline. The circuitry may further apply the first ML model on the source audio signal based on the reception of the second user input. The circuitry may further extract each of the plurality of audio signals from the source audio signal based on the application of the first ML model on the source audio signal. The circuitry may further extract each of a plurality of vocal signals from the source audio signal based on the application of the first ML model on the source audio signal. The circuitry may further apply the second ML model on each of the extracted plurality of audio signals and determine one or more musical instruments associated with each of the extracted plurality of audio signals based on the application of the second ML model. The circuitry may further determine a timestamp for each of the extracted plurality of audio signals and the extracted plurality of vocal signals in the source audio signal. The circuitry may further generate the output information as the timeline related to the second operation based on the determined one or more musical instruments, and the determined timestamp and may control the output device to render the generated output information.

In accordance with an embodiment, the circuitry may receive, via the user interface, the second user input for selection of a third operation of the plurality of operations to be performed on the source audio signal. The third operation may correspond to a generation of a transcription. The circuitry may further apply the first ML model on the source audio signal based on the reception of the second user input. The circuitry may further extract a first vocal signal of a plurality of vocal signals in the source audio signal, based on the application of the first ML model on the source audio signal. The circuitry may further apply the second ML model on the extracted first vocal signal and further generate the output information related to the selected third operation, based on the application of the second ML model. The circuitry may further control the output device to render the generated output information. The generated output information may indicate a first textual file including a transcription of the extracted first vocal signal in a textual format in a first language.

In accordance with an embodiment, the circuitry may receive, via the user interface, the second user input for selection of a fourth operation of the plurality of operations to be performed on the source audio signal. The fourth operation may correspond to a translation of the transcription. The circuitry may further receive, via the user interface, a fourth user input for selection of a second language for the translation of the transcription of the extracted first vocal signal from the first language to the second language. The circuitry may further apply a third ML model of the plurality of ML models on the first textual file based on the reception of the second user input and the fourth user input and generate the output information related to the selected fourth operation, based on the application of the third ML model. The circuitry may further control the output device to render the generated output information. The generated output information may indicate a second textual file including the transcription of the extracted first vocal signal in the second language.

In accordance with an embodiment, the circuitry may receive, via the user interface, the second user input for selection of a fifth operation of the plurality of operations to be performed on the source audio signal. The fifth operation may correspond to a recognition of a first user. The circuitry may further apply the first ML model on the source audio signal based on the reception of the second user input. The circuitry may further extract one or more first features, associated with a first vocal signal of a plurality of vocal signals in the source audio signal, based on the application of the first ML model on the source audio signal, wherein the extracted first vocal signal may be associated with the first user of a plurality of users The circuitry may further compare the extracted one or more first features associated with the first vocal signal of the first user with one or more features stored in a feature database, wherein the one or more features may be associated with each of the plurality of users. The circuitry may further recognize the first user based on the comparison and generate the output information related to the selected fifth operation based on the recognition. The output information may indicate the recognized first user. The circuitry may further control the output device to render the generated output information.

In accordance with an embodiment, the circuitry may receive, via the user interface, the second user input for selection of a sixth operation of the plurality of operations to be performed on the source audio signal. The sixth operation may correspond to a determination of an emotional state of a first user. The circuitry may further apply the first ML model on the source audio signal based on the reception of the second user input. The circuitry may further extract one or more first features, associated with a first vocal signal of a plurality of vocal signals in the source audio signal, based on the application of the first ML model on the source audio signal. The extracted first vocal signal may be associated with the first user of a plurality of users. The circuitry may further apply the second ML model on the extracted one or more first features associated with the first vocal signal of the first user. The circuitry may further determine an emotional state of the first user based on the application of the second ML model on the extracted one or more first features. The circuitry may further generate the output information related to the sixth operation based on determined emotional state and control the output device to render the generated output information, wherein the output information may indicate the determined emotional state of the first user.

In accordance with an embodiment, the circuitry may receive, via the user interface, the second user input for selection of a seventh operation of the plurality of operations to be performed on the source audio signal. The seventh operation may correspond to genre identification. The circuitry may further apply the first ML model on the source audio signal based on the reception of the second user input. The circuitry may further extract one or more audio features, associated with one or more audio signals of the plurality of audio signals, based on the application of the first ML model on the source audio signal. The circuitry may further apply the second ML model on the extracted one or more audio features associated with the one or more audio signals. The circuitry may further determine genre information associated with the one or more audio signals based on the application of the second ML model on the extracted one or more audio features. The circuitry may further generate the output information related to the seventh operation based on the determined genre information. The circuitry may further control the output device to render the generated output information.

In accordance with an embodiment, the circuitry may receive, via the user interface, the second user input for selection of an eighth operation of the plurality of operations to be performed on the source audio signal. The eighth operation may correspond to an equalization of the source audio signal. The circuitry may further apply the first ML model on the source audio signal based on the reception of the second user input. The circuitry may further extract at least the first audio signal from the plurality of audio signals in the source audio signal based on the application of the first ML model on the source audio signal. The circuitry may further apply the second ML model on the extracted at least first audio signal from the plurality of audio signals, based on the eighth operation which may be selected based on the second user input. The circuitry may further modify an amplitude of the extracted at least first audio signal based on the application of the second ML model on the extracted at least first audio signal, wherein the modification of the amplitude of the extracted at least first audio signal may correspond to an increase in the amplitude of the extracted at least first audio signal. The circuitry may further generate the output information related to the eighth operation, based on the modification. The circuitry may further control the output device to render the generated output information indicating the equalized source audio signal including the modified at least first audio signal.

In accordance with an embodiment, the circuitry may receive, via the user interface, the second user input for selection of a ninth operation of the plurality of operations to be performed on the source audio signal. The ninth operation may correspond to an equalization of the source audio signal. The circuitry may further apply the first ML model on the source audio signal based on the reception of the second user input. The circuitry may further extract at least a second audio signal from the plurality of audio signals in the source audio signal based on the application of the first ML model on the source audio signal. The circuitry may further apply the second ML model on the extracted at least second audio signal from the plurality of audio signals, based on the ninth operation which may be selected based on the second user input. The circuitry may further modify an amplitude of the extracted at least second audio signal based on the application of the second ML model on the extracted at least second audio signal, wherein the modification of the amplitude of the extracted at least second audio signal may correspond to a decrease in the amplitude of the extracted at least second audio signal. The circuitry may further generate the output information related to the ninth operation, based on the modification. The circuitry may control the output device to render the generated output information indicating the equalized source audio signal including the modified at least second audio signal.

In accordance with an embodiment, the circuitry may receive, via the user interface, the second user input for selection of a tenth operation. The tenth operation may correspond to a combination of at least two audio signals. The circuitry may further apply receive, via the user interface, a fifth user input for selection of a third audio signal and a fourth audio signal. The third audio signal may be associated with a first musical instrument and the fourth audio signal may be associated with a second musical instrument. The circuitry may further apply the plurality of ML models on the received third audio signal and on the received fourth audio signal based on the reception of the second user input and the fifth user input. The circuitry may further generate the output information related to the selected tenth operation based on the application of the plurality of ML models. The generated output information may indicate a combined audio signal including the combination of the third audio signal and the fourth audio signal. The circuitry may further control the output device to render the generated output information.

In accordance with an embodiment, the first operation may correspond to an equalization of the source audio signal without the equalization of the extracted at least first audio signal, and wherein the output information may indicate a final audio signal which may include equalized audio signals, of the plurality of audio signals, which may be other than the extracted at least first audio signal.

In accordance with an embodiment, the circuitry may receive, via the user interface, a plurality of training audio signals associated with a plurality of musical instruments. The circuitry may further receive, via the user interface, a plurality of training vocal signals associated with a plurality of users. The circuitry may further superimpose a first training audio signal of the plurality of training audio signals with at least one of a second training audio signal of the plurality of training audio signals or with at least one of a first training vocal signal of the plurality of training vocal signals. The circuitry may further generate the training dataset further based on the superimposition. The circuitry may further train the plurality of ML models based on the generated training dataset.

In accordance with an embodiment, the training dataset may include a plurality of training signals which include the plurality of training audio signals and the plurality of training vocal signals. In such embodiment, the circuitry may encode each of the plurality of training signals into a frequency and time domain signal. The circuitry may further extract one or more audio features associated with each of the plurality of training signals. The circuitry may further select at least one of the extracted one or more audio features. The circuitry may further generate a vector of encoding for the selected at least one of the extracted one or more audio features and train at least one ML model of the plurality of ML models further based on the generated encoding vector.

In accordance with an embodiment, the circuitry may encode the source audio signal into a frequency and time domain signal. The circuitry may further extract one or more audio features associated with the source audio signal. The circuitry may further select at least one of the extracted one or more features based on the encoded source audio signal. The circuitry may further generate an encoding vector for the selected at least one of the extracted one or more audio features. The circuitry may further select the first ML model from the plurality of ML models based on the selected at least one of the extracted one or more audio features and the generated encoding vector. The circuitry may further apply the selected first ML model on the generated encoding vector and may extract at least the first audio signal from the plurality of audio signals in the source audio signal based on the application of the first ML model on the generated encoding vector.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
   circuitry configured to:
   receive, via a user interface, a first user input for a selection of a source audio signal,
      wherein the source audio signal is a composite audio signal including a plurality of audio signals;
   receive, via the user interface, a second user input for a selection of a first operation of a plurality of operations to be performed on the source audio signal;
   receive, via the user interface, a third user input for a selection of at least a first audio signal from the plurality of audio signals;
   apply a first machine learning (ML) model of a plurality of ML models on the source audio signal, based on the reception of the first user input and the third user input;
   extract at least the first audio signal from the plurality of audio signals in the source audio signal based on the application of the first ML model on the source audio signal;
   apply, based on the reception of the second user input, a second ML model of the plurality of ML models on the extracted at least first audio signal to perform the selected first operation;
   generate output information related to the selected first operation, based on the application of the second ML model on the extracted at least first audio signal,
      wherein
      the first operation corresponds to a first equalization of the source audio signal without an equalization of the extracted at least first audio signal,
      the generated output information indicates a final audio signal including equalized audio signals of the plurality of audio signals, and
      the equalized audio signals are different from the extracted at least first audio signal; and
   control an output device to render the generated output information.

2. The electronic device according to claim 1, wherein
   the first operation further corresponds to a removal of the extracted at least first audio signal from the source audio signal, and
   the generated output information further indicates the final audio signal generated based on the removal of the extracted at least first audio signal from the source audio signal.

3. The electronic device according to claim 1, wherein the circuitry is further configured to:
   receive, via the user interface, the second user input for a selection of a second operation of the plurality of operations to be performed on the source audio signal,
      wherein the second operation corresponds to a generation of a timeline;
   apply the first ML model on the source audio signal based on the reception of the second user input;
   extract the plurality of audio signals from the source audio signal based on the application of the first ML model on the source audio signal;
   extract a plurality of vocal signals from the source audio signal based on the application of the first ML model on the source audio signal;
   apply the second ML model on each audio signal of the extracted plurality of audio signals;
   determine one or more musical instruments associated with the each audio signal of the extracted plurality of audio signals, based on the application of the second ML model on the each audio signal of the extracted plurality of audio signals;
   determine a timestamp for the each audio signal of the extracted plurality of audio signals and each voice signal of the extracted plurality of vocal signals in the source audio signal; and
   generate the output information as the timeline related to the second operation, based on the determined one or more musical instruments and the determined timestamp.

4. The electronic device according to claim 1, wherein the circuitry is further configured to:
   receive, via the user interface, the second user input for a selection of a third operation of the plurality of operations to be performed on the source audio signal,
      wherein the third operation corresponds to a generation of a transcription;
   apply the first ML model on the source audio signal based on the reception of the second user input;
   extract a vocal signal of a plurality of vocal signals in the source audio signal, based on the application of the first ML model on the source audio signal;
   apply the second ML model on the extracted vocal signal; and generate the output information related to the selected third operation, based on the application of the second ML model on the extracted vocal signal,
wherein the generated output information related to the selected third operation indicates a first textual file including a transcription of the extracted vocal signal in a textual format in a first language.

5. The electronic device according to claim 4, wherein the circuitry is further configured to:
receive, via the user interface, the second user input for a selection of a fourth operation of the plurality of operations to be performed on the source audio signal, wherein the fourth operation corresponds to a translation of the transcription;
receive, via the user interface, a fourth user input for a selection of a second language for the translation of the transcription of the extracted vocal signal from the first language to the second language;
apply a third ML model of the plurality of ML models on the first textual file, based on the reception of the second user input and the fourth user input; and
generate the output information related to the selected fourth operation, based on the application of the third ML model on the first textual file,
wherein the generated output information related to the selected fourth operation indicates a second textual file including the transcription of the extracted vocal signal in the second language.

6. The electronic device according to claim 1, wherein the circuitry is further configured to:
receive, via the user interface, the second user input for a selection of a fifth operation of the plurality of operations to be performed on the source audio signal, wherein the fifth operation corresponds to a recognition of a user of a plurality of users;
apply the first ML model on the source audio signal based on the reception of the second user input;
extract one or more first features associated with a vocal signal of a plurality of vocal signals in the source audio signal, based on the application of the first ML model on the source audio signal,
wherein the vocal signal is associated with the user;
compare the extracted one or more first features with one or more second features stored in a feature database, wherein the one or more second features are associated with each user of the plurality of users;
recognize the user based on the comparison; and
generate the output information related to the selected fifth operation based on the recognition,
wherein the generated output information related to the selected fifth operation indicates the recognized user.

7. The electronic device according to claim 1, wherein the circuitry is further configured to:
receive, via the user interface, the second user input for a selection of a sixth operation of the plurality of operations to be performed on the source audio signal, wherein the sixth operation corresponds to a determination of an emotional state of a user of a plurality of users;
apply the first ML model on the source audio signal based on the reception of the second user input;
extract one or more features associated with a vocal signal of a plurality of vocal signals in the source audio signal, based on the application of the first ML model on the source audio signal,
wherein the vocal signal is associated with the user;
apply the second ML model on the extracted one or more features;
determine the emotional state of the user based on the application of the second ML model on the extracted one or more features; and
generate the output information related to the sixth operation,
wherein the generated output information related to the sixth operation indicates the determined emotional state of the user.

8. The electronic device according to claim 1, wherein the circuitry is further configured to:
receive, via the user interface, the second user input for a selection of a seventh operation of the plurality of operations to be performed on the source audio signal, wherein the seventh operation corresponds to genre identification;
apply the first ML model on the source audio signal based on the reception of the second user input;
extract one or more audio features associated with one or more audio signals of the plurality of audio signals, based on the application of the first ML model on the source audio signal;
apply the second ML model on the extracted one or more audio features associated with the one or more audio signals;
determine genre information associated with the one or more audio signals, based on the application of the second ML model on the extracted one or more audio features; and
generate the output information related to the seventh operation based on the determined genre information.

9. The electronic device according to claim 1, wherein the circuitry is further configured to:
receive, via the user interface, the second user input for a selection of an eighth operation of the plurality of operations to be performed on the source audio signal, wherein the eighth operation corresponds to a second equalization of the source audio signal;
apply the first ML model on the source audio signal based on the reception of the second user input;
extract at least the first audio signal from the plurality of audio signals in the source audio signal based on the application of the first ML model on the source audio signal;
apply, based on the eighth operation, the second ML model on the extracted at least first audio signal;
modify an amplitude of the extracted at least first audio signal based on the application of the second ML model on the extracted at least first audio signal,
wherein the modification of the amplitude of the extracted at least first audio signal corresponds to an increase in the amplitude of the extracted at least first audio signal; and
generate the output information related to the eighth operation, based on the modification,
wherein the generated output information related to the eighth operation indicates the source audio signal, after the second equalization, including at least the first audio signal having the increased amplitude.

10. The electronic device according to claim 1, wherein the circuitry is further configured to:
receive, via the user interface, the second user input for a selection of a ninth operation of the plurality of operations to be performed on the source audio signal, wherein the ninth operation corresponds to a third equalization of the source audio signal;

apply the first ML model on the source audio signal based on the reception of the second user input;
extract at least a second audio signal from the plurality of audio signals in the source audio signal based on the application of the first ML model on the source audio signal;
apply, based on the ninth operation, the second ML model on the extracted at least second audio signal;
modify an amplitude of the extracted at least second audio signal based on the application of the second ML model on the extracted at least second audio signal,
wherein the modification of the amplitude of the extracted at least second audio signal corresponds to a decrease in the amplitude of the extracted at least second audio signal; and
generate the output information related to the ninth operation, based on the modification,
wherein the generated output information related to the ninth operation indicates the equalized source audio signal, after the third equalization, including at least the second audio signal having the decreased amplitude.

11. The electronic device according to claim 1, wherein the circuitry is further configured to:
receive, via the user interface, the second user input for a selection of a tenth operation of the plurality of operations;
receive, via the user interface, a fifth user input for a selection of a third audio signal of the plurality of audio signals and a fourth audio signal of the plurality of audio signals, wherein
the tenth operation corresponds to a combination of the third audio signal and the fourth audio signal, and
the third audio signal is associated with a first musical instrument and the fourth audio signal is associated with a second musical instrument;
apply the plurality of ML models on the third audio signal and on the fourth audio signal based on the reception of the second user input and the fifth user input; and
generate the output information related to the selected tenth operation, based on the application of the plurality of ML models on the third audio signal and the fourth audio signal,
wherein the generated output information related to the selected tenth operation indicates a combined audio signal including the combination of the third audio signal and the fourth audio signal.

12. The electronic device according to claim 1, wherein the circuitry is further configured to:
receive, via the user interface, a plurality of training audio signals associated with a plurality of musical instruments;
receive, via the user interface, a plurality of training vocal signals associated with a plurality of users;
generate a training dataset based on the received plurality of training audio signals and the received plurality of training vocal signals; and
train the plurality of ML models based on the generated training dataset.

13. The electronic device according to claim 12, wherein the circuitry is further configured to:
superimpose a first training audio signal of the plurality of training audio signals with at least one of a second training audio signal of the plurality of training audio signals or a training vocal signal of the plurality of training vocal signals; and
generate the training dataset based on the superimposition.

14. The electronic device according to claim 12, wherein the training dataset comprises a plurality of training signals which includes the plurality of training audio signals and the plurality of training vocal signals, and the circuitry is further configured to:
encode each training signal of the plurality of training signals into a frequency and time domain signal;
extract one or more audio features associated with the each training signal of the plurality of training signals;
select, based on the frequency and time domain signal, at least one audio feature of the extracted one or more audio features;
generate an encoding vector for the selected at least one audio feature; and
train at least one ML model of the plurality of ML models based on the generated encoding vector.

15. The electronic device according to claim 1, wherein the circuitry is further configured to:
encode the source audio signal into a frequency and time domain signal;
extract one or more audio features associated with the source audio signal;
select, based on the frequency and time domain signal, at least one audio feature of the extracted one or more audio features;
generate an encoding vector for the selected at least one audio feature;
select the first ML model from the plurality of ML models, based on the selected at least one audio feature and the generated encoding vector;
apply the selected first ML model on the generated encoding vector; and
extract at least the first audio signal from the plurality of audio signals in the source audio signal based on the application of the first ML model on the generated encoding vector.

16. A method, comprising:
in an electronic device:
receiving, via a user interface, a first user input for a selection of a source audio signal,
wherein the source audio signal is a composite audio signal including a plurality of audio signals;
receiving, via the user interface, a second user input for a selection of a first operation of a plurality of operations to be performed on the source audio signal;
receiving, via the user interface, a third user input for a selection of at least a first audio signal from the plurality of audio signals;
applying a first machine learning (ML) model of a plurality of ML models on the source audio signal, based on the reception of the first user input and the third user input;
extracting at least the first audio signal from the plurality of audio signals in the source audio signal based on the application of the first ML model on the source audio signal;
applying, based on the reception of the second user input, a second ML model of the plurality of ML models on the extracted at least first audio signal to perform the selected first operation;

generating output information related to the selected first operation, based on the application of the second ML model on the extracted at least first audio signal, wherein
- the first operation corresponds to an equalization of the source audio signal without an equalization of the extracted at least first audio signal,
- the generated output information indicates a final audio signal including equalized audio signals of the plurality of audio signals, and
- the equalized audio signals are different from the extracted at least first audio signal; and controlling an output device to render the generated output information.

17. The method according to claim 16, wherein
the first operation further corresponds to a removal of the extracted at least first audio signal from the source audio signal, and
the generated output information further indicates the final audio signal generated based on the removal of the extracted at least first audio signal from the source audio signal.

18. The method according to claim 16, further comprising:
receiving, via the user interface, the second user input for a selection of a second operation of the plurality of operations to be performed on the source audio signal, wherein the second operation corresponds to a generation of a timeline;
applying the first ML model on the source audio signal based on the reception of the second user input;
extracting the plurality of audio signals from the source audio signal based on the application of the first ML model on the source audio signal;
extracting a plurality of vocal signals from the source audio signal based on the application of the first ML model on the source audio signal;
applying the second ML model on each voice signal of the extracted plurality of audio signals;
determining one or more musical instruments associated with the each voice signal of the extracted plurality of audio signals, based on the application of the second ML model on each audio signal of the extracted plurality of audio signals;
determining a timestamp for the each audio signal of the extracted plurality of audio signals and the each voice signal of the extracted plurality of vocal signals in the source audio signal; and generating the output information as the timeline related to the second operation, based on the determined one or more musical instruments and the determined timestamp.

19. A non-transitory computer-readable medium having stored thereon, computer-executable instructions that when executed by an electronic device, causes the electronic device to execute operations, the operations comprising:
receiving, via a user interface, a first user input for a selection of a source audio signal,
  wherein the source audio signal is a composite audio signal including a plurality of audio signals;
receiving, via the user interface, a second user input for a selection of a first operation of a plurality of operations to be performed on the source audio signal;
receiving, via the user interface, a third user input for a selection of at least a first audio signal from the plurality of audio signals;
applying a first machine learning (ML) model of a plurality of ML models on the source audio signal, based on the reception of the first user input and the third user input;
extracting at least the first audio signal from the plurality of audio signals in the source audio signal based on the application of the first ML model on the source audio signal;
applying, based on the reception of the second user input, a second ML model of the plurality of ML models on the extracted at least first audio signal to perform the selected first operation;
generating output information related to the selected first operation, based on the application of the second ML model on the extracted at least first audio signal, wherein
- the first operation corresponds to an equalization of the source audio signal without an equalization of the extracted at least first audio signal,
- the generated output information indicates a final audio signal including equalized audio signals of the plurality of audio signals, and
- the equalized audio signals are different from the extracted at least first audio signal; and controlling an output device to render the generated output information.

* * * * *